US012536531B2

(12) United States Patent
Lanman et al.

(10) Patent No.: US 12,536,531 B2
(45) Date of Patent: Jan. 27, 2026

(54) METHODS AND SYSTEMS FOR MANAGING CRYPTOCURRENCY

(71) Applicant: Block, Inc., Oakland, CA (US)

(72) Inventors: Ryan Lanman, San Francisco, CA (US); Alexander Schoof, Leesburg, VA (US); Arvin Aminpour, New York, NY (US); Clayton Garrett, Atlanta, GA (US)

(73) Assignee: Block, Inc., Oakland, CA (US)

( * ) Notice: Subject to any disclaimer, the term of this patent is extended or adjusted under 35 U.S.C. 154(b) by 170 days.

(21) Appl. No.: 18/223,486

(22) Filed: Jul. 18, 2023

(65) Prior Publication Data
US 2024/0037542 A1   Feb. 1, 2024

Related U.S. Application Data

(60) Provisional application No. 63/396,208, filed on Aug. 8, 2022.

(51) Int. Cl.
*G06Q 20/38* (2012.01)
*G06Q 20/06* (2012.01)
(Continued)

(52) U.S. Cl.
CPC ....... *G06Q 20/3825* (2013.01); *G06Q 20/065* (2013.01); *G06Q 20/3829* (2013.01);
(Continued)

(58) Field of Classification Search
CPC ............. G06Q 20/3825; G06Q 20/065; G06Q 20/3829; G06Q 20/401; G06Q 2220/00; H04L 9/0825; H04L 9/3247
See application file for complete search history.

(56) References Cited

U.S. PATENT DOCUMENTS 6,834,112 B1 * 12/2004 Brickell ................ H04L 9/3236
380/279
8,832,788 B1 * 9/2014 Gibson ................... G06F 21/40
726/28
(Continued)

FOREIGN PATENT DOCUMENTS

CN    106778702 A    5/2017
CN    206684749 U   11/2017
(Continued)

OTHER PUBLICATIONS

Felix Horandner et al., Horcruxes for Everyone—A Framework for Key-Loss Recovery by Splitting Trust, Oct. 31, 2019, IEEE, pp. 50-57 (Year: 2019).*

(Continued)

*Primary Examiner* — Nilesh B Khatri
(74) *Attorney, Agent, or Firm* — Polsinelli PC

(57) ABSTRACT

The present disclosure generally relates to methods, systems, apparatuses, and non-transitory computer readable media for managing cryptocurrency. A cryptocurrency management system has a cryptocurrency management device (CMD), a mobile communication device (MCD), and a cryptocurrency management server (CMS) that are each configured to store a respective private key for use in generating a respective authenticating signature for a multi-signature address of a cryptocurrency network. Any two of the three authenticating signatures capable of being generated by the CMD, MCD, and CMS may be combined to generate a fully authenticated request for transferring cryptocurrency associated with the multi-signature address. The system provides the user with a flexible self-custody solution that permits him or her to transfer cryptocurrency without having to access the private key stored at the CMS. However, the CMS enables for recovery in the event of loss (Continued)

or unavailability of one or both of the CMD and/or the MCD.

27 Claims, 8 Drawing Sheets

(51) Int. Cl.
    G06Q 20/40    (2012.01)
    H04L 9/08     (2006.01)
    H04L 9/32     (2006.01)
(52) U.S. Cl.
    CPC ......... *G06Q 20/401* (2013.01); *H04L 9/0825* (2013.01); *H04L 9/3247* (2013.01); *G06Q 2220/00* (2013.01)

(56) References Cited

U.S. PATENT DOCUMENTS

| | | | |
|---|---|---|---|
| 2009/0024533 A1* | 1/2009 | Fernandes | G06Q 20/3223 705/39 |
| 2014/0281545 A1* | 9/2014 | Erofeev | G06F 11/1402 713/171 |
| 2014/0324722 A1* | 10/2014 | Schechter | G06Q 50/265 705/325 |
| 2015/0019892 A1 | 1/2015 | Agrawal et al. | |
| 2015/0310424 A1 | 10/2015 | Myers | |
| 2015/0324789 A1* | 11/2015 | Dvorak | H04L 9/3297 705/67 |
| 2016/0203572 A1 | 7/2016 | McConaghy et al. | |
| 2017/0103391 A1 | 4/2017 | Wilson et al. | |
| 2018/0331414 A1 | 11/2018 | Tunnell et al. | |
| 2018/0367316 A1* | 12/2018 | Cheng | G06F 21/72 |
| 2019/0068247 A1 | 2/2019 | Hueber et al. | |
| 2019/0213586 A1 | 7/2019 | Baratam | |
| 2019/0244207 A1 | 8/2019 | Samuel | |
| 2019/0325408 A1 | 10/2019 | Goroff et al. | |
| 2020/0019937 A1* | 1/2020 | Edwards | G06Q 20/223 |
| 2022/0057519 A1 | 2/2022 | Goldstein et al. | |
| 2022/0255945 A1* | 8/2022 | Guan | H04L 63/102 |
| 2023/0153276 A1* | 5/2023 | Reinsberg | H04L 9/0643 707/827 |
| 2023/0155839 A1 | 5/2023 | Kreder et al. | |
| 2024/0144233 A1 | 5/2024 | Maibach | |
| 2024/0144272 A1 | 5/2024 | Maibach | |
| 2024/0346120 A1 | 10/2024 | Khuri-Yakub et al. | |

FOREIGN PATENT DOCUMENTS

| | | |
|---|---|---|
| CN | 110225042 A | 9/2019 |
| WO | 86/03315 A1 | 6/1986 |
| WO | 2021/019056 A1 | 2/2021 |
| WO | 2024/035707 A1 | 2/2024 |
| WO | 2024/091433 A1 | 5/2024 |

OTHER PUBLICATIONS

Timothy B. Lee, "Bitcoin Has a Huge Scaling Problem—Lightning Could be the Solution", Feb. 4, 2018, Ars Technica, pp. 1-28.

* cited by examiner

METHODS AND SYSTEMS FOR MANAGING CRYPTOCURRENCY

CROSS-REFERENCE TO RELATED APPLICATIONS

This application claims priority to U.S. Provisional Patent Application No. 63/396,208, filed on Aug. 8, 2022, which is incorporated herein by reference in its entirety.

TECHNICAL FIELD

Cryptocurrency, such as Bitcoin, is increasing in popularity and has many advantages. In this regard, cryptocurrency provides a digital form of currency that may be transferred from one party to another through a global computer network, such as the internet, thereby facilitating the storage and transfer of financial assets for financial transactions. This digital nature allows cryptocurrency to provide numerous benefits not possible through more traditional currency. However, the digital nature of cryptocurrency also raises unique challenges. For example, the use of cryptographic keys to access and control cryptocurrency assets may involve users maintaining and storing these keys. This may cause increased complexity to users and may increase the possibility a user loses access to their cryptocurrency assets through loss of their stored cryptographic keys. Additionally, storage of these cryptographic keys may also raise the possibility of malicious actors gaining access to a user's stored cryptographic keys and subsequently stealing the user's cryptocurrency assets.

In particular, users of cryptocurrency often face a choice between third-party custody and self-custody. In third-party custody, the owner depends on a third party to hold information, such as private keys, that is used in establishing ownership and transferring cryptocurrency. Such a solution may be appealing to users who do not wish to be burdened with many of the complexities of holding, processing, and transferring information related to the cryptocurrency. However, many users may be concerned about the security measures used by third-party custodians to keep the cryptocurrency secure and also retaining the ability to access the cryptocurrency from the third-party custodians, such as during bankruptcy or other unanticipated events, as well as the loss of credentials required by the third-party custodians. With self-custody, the owner must wade through the technical complexities associated with managing cryptocurrency and also deal with security concerns. Many users may also be concerned about their ability to access cryptocurrency in the event of the loss of or damage to hardware used to store and otherwise manage the cryptocurrency.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
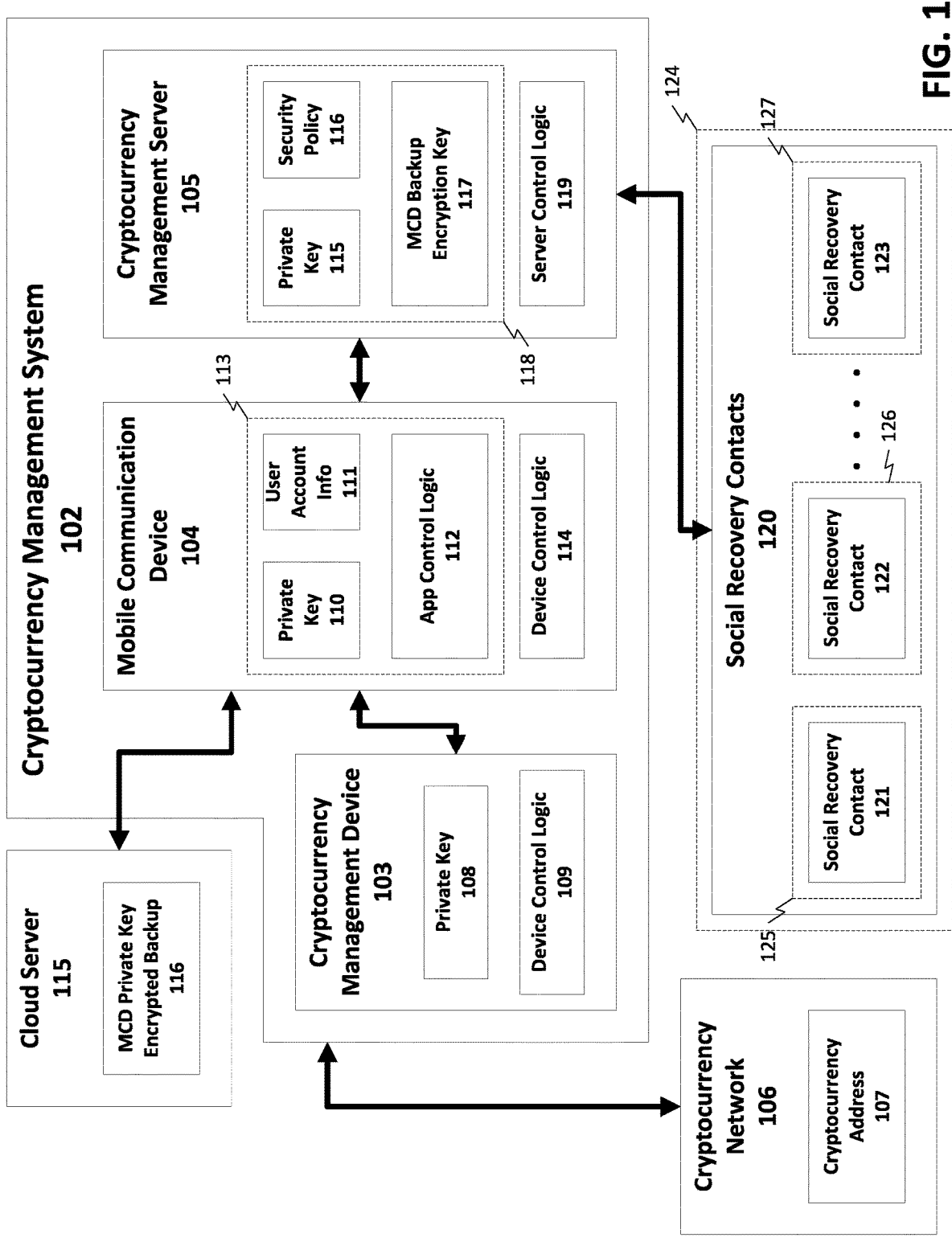
FIG. 1 is a block diagram of an exemplary cryptocurrency management system.

The present disclosure generally pertains to system and methods for managing and using digital financial assets, such as cryptocurrency. In some embodiments of the present disclosure, a cryptocurrency management system has a cryptocurrency management device (CMD), a mobile communication device (MCD), and a cryptocurrency management server (CMS) that are each configured to store a respective private key for use in generating a respective authenticating signature for a multi-signature address of a cryptocurrency network. Any two of the three authenticating signatures capable of being generated by the CMD, MCD, and CMS may be combined to generate a fully authenticated request for transferring cryptocurrency associated with the multi-signature address. The system provides the user with a flexible self-custody solution that permits him or her to transfer cryptocurrency without having to access the private key stored at the CMS. Additionally, the CMS enables recovery in the event of loss or unavailability of one or both of the CMD and/or the MCD.

In some embodiments of the present disclosure, the MCD has an application that generally controls management of the cryptocurrency. Certain data used by the application—such as various private keys—is backed up by storing an encrypted copy of the data on a cloud server, with a copy of the key used to encrypt the backup data provided to the CMS. In the event of a loss of the original MCD or application, the encrypted backup data may be downloaded to a new MCD (or the original MCD, if available) and used to recover the private key stored in the original MCD. Specifically, the MCD may communicate with the CMS to obtain the key used to encrypt the backup and decrypt the backup using the obtained encryption key to recover the private key stored in the original MCD. In some embodiments, the user may be authenticated for key recovery or cryptocurrency transactions by providing a biometric input to the MCD or otherwise without having to provide a password, PIN or other information to be remembered, thereby enhancing the flexibility of the system.

During recovery of a lost private key, the system may be configured to delay completion financial transactions and provide notification of pending financial transactions so that an authorized user may be notified of and then cancel any transactions that he deems to be fraudulent. In some embodiments, the system also enforces at least some constraints, such as spending limits, during the recovery process once the system has been notified of a lost key, thereby limiting the amount of funds that could be transferred by an unauthorized user potentially exploiting vulnerabilities in the recovery process.

In some embodiments, the authorized user during registration is permitted to list social recovery contacts who may be used for authentication in the recovery of a lost key. In this regard, when a key is lost, the system provides codes that the authorized user may communicate to the social recovery contacts. The system also communicates with the social recovery contacts and prompts them to provide the codes. If at least a minimum number of the social recovery contacts provide valid codes, the system authenticates the user during the recovery process to permit recovery of the lost key or keys. Thus, the authorized user may be authenticated without having to provide a password, PIN, or other information to be remembered by the user, thereby facilitating recovery.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

One of the potential barriers to more mainstream adoption of self-custody solutions is the need to create and physically protect sight-sensitive backup material in order to stay safe. This means moving away from reliance on long (e.g., 12- or 24-word) seed phrases that (to be secure) users record on a medium like paper or metal. For such a solution, an unauthorized user who gets even brief access to this material could use it to steal or otherwise misappropriate the cryptocurrency. Seed phrases have worked well for many experienced users. However, seed phrases can create intimidating experiences for new users of cryptocurrency and also provide relatively easy opportunity for bad actors to exploit customers who do not fully understand their importance, such as by convincing a customer to share a seed phrase over the phone, tricking a customer into entering an already-compromised seed phrase at wallet setup time, or compromising a customer's cloud storage account that contains a photo of the paper physical seed phrase card that came with their wallet. In addition, many users create secrets, like passwords, that are sometimes simple to remember but may also be vulnerable to hackers, and in some cases, users may create secrets that are more secure but difficult to remember. Techniques for providing robust security of assets, like cryptocurrency, without requiring users to remember complex secrets (e.g., passwords) are generally desired.

Towards this end, allowing recovery of a lost private key that does not require the user to maintain backup material and that also does not require the user to cede control over the cryptocurrency account to a third-party are generally desired.

FIG. 1 is a simplified block diagram of a cryptocurrency management system. As shown by the figure, a cryptocurrency management system 102 may comprise a cryptocurrency management device (CMD) 103, a cryptocurrency management server (CMS) 105, and a mobile communication device (MCD) 104. Also shown by FIG. 1 is a cryptocurrency network 106 and a cryptocurrency address 107 associated with (one or more transactions in) the cryptocurrency network 106. In general, the MCD 104 may interact with the CMD 103 and the CMS 105 to, among other things, generate and submit valid cryptocurrency transactions. As part of this process, the CMS 105 and the MCD 104 may also interact with the cryptocurrency network 106.

In general, each of the devices 103, 104, and 105 may also comprise a cryptocurrency account private key (i.e., private keys 108, 110, and 115) and control logic (i.e., control logic 109, 112, 114, and 119). As described further below, each private key 108, 110, and 115 is a cryptographic key associated with the private key of the public-private key pair (the private key of one of the public-private key pairs, for multi-signature addresses) of a cryptocurrency address (e.g., cryptocurrency address 107). As also described further below, the control logics 109, 112, 114, and 119 may contain instructions that can be executed by their device's respective processor or set of processors to perform various functions of that device.

The private key 110 may be associated with a cryptocurrency management application (app) 113 being executed by the MCD 104 for the purpose of generally managing the cryptocurrency address 107. Towards this end, the cryptocurrency management app 113 may be associated with user account info 111 that is used to authenticate the MCD 104 to the CMS 105 and generally allow interacting by the cryptocurrency management app 113 with the MCD 105. The cryptocurrency management app may also be associated with app control logic 112 that contain instructions that can be executed by the processor or set of processors of the MCD 104 to perform the functions of the cryptocurrency management app 113. Note that, in some embodiments of the present disclosure, the functions described herein as being performed by the app control logic 112 may be performed by the device control logic 114 and vice-versa. In some embodiments, there app control logic 112 and the device control logic 114 are combined into a single control logic that can be used to orchestrate the operation of the MCD 104 and manage cryptocurrency according to the techniques described herein.

The MCD 104 may also be associated with a cloud server 115 which the MCD 104 can use to store certain data off-device, such as for storing data backups. As part of this, the cryptocurrency management app 113 may encrypt a copy of the private key 110 and store the encrypted copy on the cloud server 115 as MCD private key encrypted backup 116. The MCD 104 may provide a copy of the encryption key used to encrypt the backup 116—referred to as the MCD backup encryption key 117—to the CMS 105. The CMS 105 may associate the MCD backup encryption key 117 and store the MCD backup encryption key 117 on non-volatile memory accessible by the CMS 105. Note that the cryptocurrency management app 113 may also store other data on the cloud server 115. Also note that the cryptocurrency management app 113 may, in some embodiments, maintain a local copy of the MCD backup encryption key 117.

Additionally, the private key 115 may be associated with a user account 118. The user account 118 may be managed as part of an online platform maintained by a third-party custodian, with the online platform including the CMS 105. As is described in more detail below, the user account 118 may be associated with additional information, including the cryptocurrency address 107, information about the user (also known as the owner) of the user account 118, an MCD backup encryption key 117, and various configuration options, such as a security policy 116.

At a high level, the cryptocurrency management system 102 works to manage the cryptocurrency address 107 by controlling use of the cryptocurrency funds associated with the cryptocurrency address 107 in a transaction. In this regard, the cryptocurrency management system 102 can be thought of as an association of devices or systems that (1) each have been distributed a portion of the authority to control the cryptocurrency address 107 and (2) are configured to cooperate with one another to use their collective authority to control (e.g., generate and submit a transaction involving) the cryptocurrency address 107. In other words, the ability to manage the cryptocurrency address 107 is split between the CMD 103, the MCD 104, and the CMS 105. In some embodiments, the CMD 103, the MCD 104, and the CMS 105 communicate with one another and agree to a transaction before the signatures for the transaction are obtained and an authenticated transaction is generated and submitted to the cryptocurrency network 106.

In some embodiments, the cryptocurrency address 107 is a multi-signature address whose private keys are used as the authenticating keys distributed across the CMD 103, the MCD 104, or the CMS 105. As an example, there may be three private keys associated with the cryptocurrency address 107 and each of the CMD 103, the MCD 104, and the CMS 105 may store a respective one of them, and each of the CMD 103, the MCD 104, and the CMS 105 may permit access to its private key only if the user is able to provide acceptable authentication credentials. Further, the cryptocurrency address 107 may be configured such that any two of the private keys can be used to generate a fully authenticated cryptocurrency transaction request for the cryptocurrency asset associated with the cryptocurrency address 107. In other embodiments, other numbers of private keys may be used to generate a fully authenticated cryptocurrency transaction request.

In some embodiments, the owner of the cryptocurrency asset associated with the address 107 may maintain physical possession of the CMD 103 and the MCD 104, whereas the CMS 105 is maintained by a trusted third party. Further, the owner may keep the CMD 103 in a secure location, such as at home. Thus, if the MCD 104 is stolen, an unauthorized user should be unable to use the MCD 104 to generate a fully authenticated cryptocurrency transaction involving the cryptocurrency assets associated with the cryptocurrency address 107 since the unauthorized user (1) would not have physical access to or be able to communicate with the CMD 103 (which may be designed to permit only short-range communication, as described above) and (2) would be unable to access the private key stored at the CMS 105 without providing valid authentication credentials to the CMS 105.

In addition, when the owner desires to initiate a transaction, the owner may bring the MCD 104 to the CMD 103 or the CMD 103 to the MCD 104 so that the CMD 103 and the MCD 104 may communicate to generate a fully authenticated cryptocurrency transaction. In this regard, after providing valid authentication credentials to the CMD 103, the CMD 103 may use the private key stored therein to generate an authenticating signature that is communicated to the CMD 103, and the CMD 103 may use the private key stored therein to generate an authenticating signature that can be combined with the authenticating signature from the CMD 103 in order to generate a fully authenticated request for a cryptocurrency transaction. The CMD 103 may then transmit such request to the cryptocurrency network 106. Thus, using the devices (i.e., the CMD 103 and MCD 104) within the owner's physical possession, he is able to generate a fully authenticated cryptocurrency transaction without use of the CMS 105, thereby giving the owner full control over the cryptocurrency transaction in the event that the CMS 105 becomes unavailable for any reason. However, the CMS 105 remains available for recovery in the event that the CMD 103 and/or the MCD 104 is lost, stolen, fails, or otherwise is unavailable.

Specifically, if the original MCD 104 is lost or otherwise becomes unavailable, the original MCD 104 may be replaced with a new MCD 104 that may communicate with the CMD 103 and the CMS 105 to obtain two authenticating signatures that may be combined to form a fully authenticated cryptocurrency transaction. Also, if the CMD 103 is lost or otherwise becomes unavailable, the MCD 104 may communicate with the CMS 105 (as described above for the CMD 103) to obtain an authenticating signature that may then be combined with an authenticating signature from the MCD 104 to generate a fully authenticated cryptocurrency transaction. Thus, the embodiment shown by FIG. 1 and described above provides flexibility to the owner while maintaining security and also permitting recovery in the event of a loss of any of the CMD 103, the MCD 104, or the CMS 105.

Additionally, the cryptocurrency management system 102 may also enable recovery of lost keys. In particular, in some embodiments the CMS 105 may be used to recover a lost private key 110, such as might occur through the loss or failure of the MCD 104. For example, in an exemplary embodiment, in the event a user loses access to the private key 110, the user may retrieve the MCD private key encrypted backup 116 from the cloud server 115 and the MCD backup encryption key 117 from the CMS 105 to recover the lost private key 110. As part of this key recovery process, the CMS 105 may require the user initiating the key recovery process to prove their identity as the owner of the user account 118.

In some embodiments, the CMS 105 may require a user to prove their identity as owner of the cryptocurrency address 107 through a process referred to hereafter as "Social Recovery" where information from certain trusted parties is used. In this regard, when the user is setting up the user account 118, the user may provide contact information (e.g., telephone number, email address, user handle with a service provider, or similar identifier) of at least one social recovery contacts who may be used to help recover or authenticate a recovery of a lost key. Specifically, the social recovery contacts 120—shown in FIG. 1 as social recovery contacts 121, 122, and 123—may be associated with social recovery contact information 124—shown in FIG. 1 as social recovery contact information 125, 126, and 127, with the social recovery contact information 121, 122, and 123 being associated with social recovery contacts 121, 122, and 123, respectively—that is stored on or otherwise kept accessible by the CMS 105.

Later, the user may utilize their user account 118 to communicate with the CMS 105 to initiate the recovery process, such as through an application on the MCD 104 or through an online web portal of the associated online platform. In response, the CMS 105 may be configured to provide a respective set of social recovery authentication information to one or more of the user's social recovery contacts. The user of the user account 118 may be instructed to request the transmitted sets of authentication information from the social recovery contacts and provide the sets of authentication information to the CMS 105. The social recovery contacts may be instructed to provide the user of the user account 118 the sets of transmitted authentication information.

After the user of the user account 118 has retrieved (a sufficient number of) the sets of social recovery authentication information, the user may provide the retrieved sets of social recovery authentication information to the CMS 105. The sets of social recovery authentication information may be provided to the CMS 105 as part of a social recovery verification message, which may include additional information from the user, such as (a hash derived from) the password associated with the user account 118. If the user provides (a sufficient number of) correct sets of social recovery authentication information—possibly along with other required information—e.g., (a hash derived from) the password associated with the user account 118—then the CMS 105 may provide the MCD backup encryption key 117 to the user, such as by directly transmitting the MCD backup encryption key 117 to the MCD 104.

Alternatively, in some embodiments, the process may be reversed, with the user of the user account 118 receiving one or more sets of social recovery authentication information associated with the social recovery contacts of the user account 118. The user may be instructed to provide these codes to each of their respective social recovery contacts and to have the contact enter the code into an online website associated with an online web portal of the associated online platform. In parallel, the social recovery contacts may be provided a message indicating that a key recovery process has been initiated for the user account 118 and providing a link to a website where the social recovery contact can enter the set of social recovery authentication information they receive from the owner of the user account 118. Naturally, the willingness of the social recovery contacts to comply with entering a set of social recovery authentication information into the website will heavily depend on the contacts' assessment of whether the owner of the user account 118—as opposed to a malicious third-party—initiated the process. Once a sufficient number of the social recovery contacts have entered the sets of social recovery authentication information they received from the owner of the user account 118, then the CMS 105 may provide the MCD backup encryption key 117 to the user, such as by directly transmitting the MCD backup encryption key 117 to the MCD 104.

In some other embodiments, the CMS 105 may provide the social recovery contacts a message indicating that a key recovery process has been initiated for the user account 118 and providing a link to a website where instead of entering sets of social recovery authentication information they receive from the owner of the user account 118, the contacts may instead submit that they verified, e.g., in any way they preferred, that the owner of the user account 118 initiated the process.

In still other embodiments, after the owner of the user account 118 indicates the social recovery contacts and before the key recovery process has been initiated for the user account 118, the CMS 105 may provide the social recovery contacts a message indicating that the contacts were identified by the owner of the user account 118 as social recovery contacts and requesting that the contacts install an application on their mobile devices to help in a later key recovery process. The CMS 105 may then use the installed applications on the mobile devices of the social recovery contacts to authenticate that the owner of the user account 118 initiated the process. In some embodiments, the installed applications may be partially installed or temporarily installed. For example, an installed application may provide application data for storage on a cloud backup, the mobile device may then uninstall the application, and when the social recovery contact is prompted to participate in a social recovery process the social recovery contact may re-install the application which may then automatically retrieve the previously stored application data from the cloud backup. In other embodiments, instead of an installed application the social recovery contacts may be asked to download and execute an application that performs the functions of the installed application without installing the application.

Figure 2:
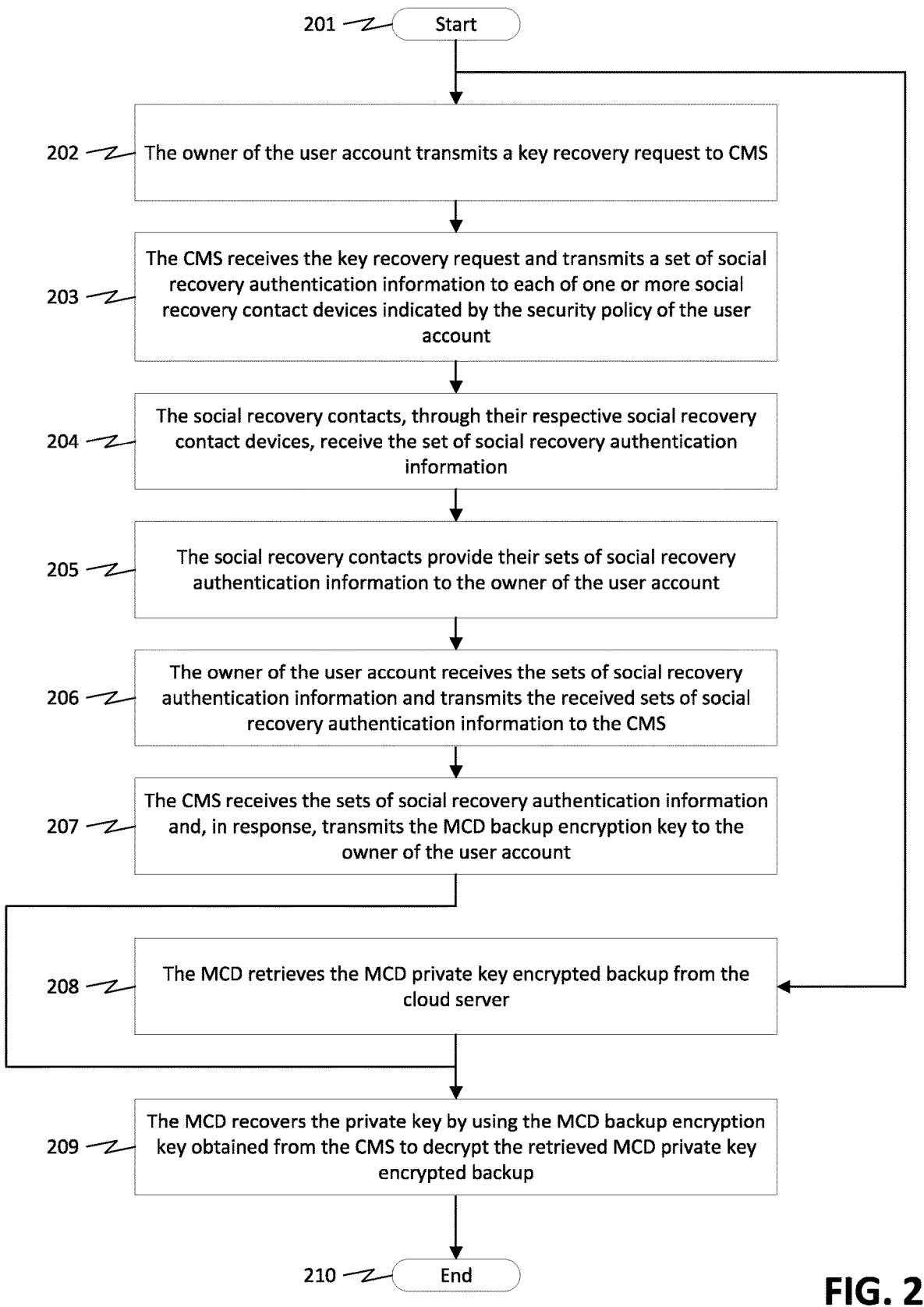
FIG. 2 is a flowchart of an exemplary method of using social recovery.

FIG. 2 is a flowchart illustrating a process of recovering a lost private key using social recovery. For example, the process may be used after a user is re-installing (and reconfiguring) the cryptocurrency management app 113 on their original MCD 104 or is installing (and configuring) the cryptocurrency management app 113 on a new MCD 104 (e.g., which might be done after loss of the original MCD 104 and replacement with a new MCD 104). In some embodiments, this process may in particular be used when access to the private key 110 is lost while access to the CMD 103 is also lost.

To start, as shown by block 202 of FIG. 2, the owner of the user account may interact with the CMS to transmit a key recovery request. In some embodiments, this may involve the user logging into the user account 118 through the cryptocurrency management app 113, with the cryptocurrency management app 113 then transmitting the key recovery request from the MCD 104 to the CMS 105. Alternatively, in some embodiments the user may log into the user account 118 through an online web portal associated with the CMS 105 and transmitting the key recovery request to the CMS 105 through this web portal. In some embodiments, the CMS 105 may require the user to provide authenticating information indicating the request is from the owner of the user account 118 before acting on the recovery request. For example, in some embodiments the CMS 105 may require the user to provide the login credentials used to access the user account 118 (e.g., a username and password). As another example, the CMS 105 may require the user to generate valid signature of a hash of data provided to the user by the CMS 105 using one of the private keys associated with the cryptocurrency address 107, such as the private key 108. The CMS 105 may then use the corresponding public key to verify the authenticity of the signature and—by also hashing the data it provided to the user—verify that the signature is for the hash sent to the user.

After the key recovery request is transmitted, the CMS may receive the request and initiate and initiate a recovery procedure according to the security policy of the user account for the cryptocurrency address. More precisely, as shown by block 203 of FIG. 2, the CMS may receive the key recovery request and transmits a set of social recovery authentication information to each of one or more social recovery contacts using the social recovery contact information indicated by the security policy of the user account. In general, the security policy indicates certain configuration options controlling what responses to CMS will take to certain actions and the requirements that the CMS will impose before taking those actions. For example, in some embodiments the CMS 105 is willing to participate in authenticating a cryptocurrency transaction requested by a user logged in to the user account 118 if the requested transaction is for less than a certain value. This value may be set as part of a subset of the security policy known as a transaction policy. As another example, the security policy 116 may indicate if the CMS 105 will participate in a key recovery operation (i.e., willing to act on a key recovery request) and what requirements the CMS 105 will impose before doing so. If the CMS 105 requires social recovery, the security policy 116 may also list contact information for one or more social recovery contacts.

For example, the CMS 105 may determine that the security policy 116 for the user indicates that social recovery contact 121, social recovery contact 122 and social recovery contact 123 are social recovery contacts for the user account 118 and based on that determination transmit a set of social recovery authentication information to the social recovery contacts 121, 122, and 123 using social recovery contact information 124 that is indicated by the security policy 116. Specifically, the CMS may transmit a set of social recovery authentication information to the social recovery contact using the social recovery contact information indicated by the security policy for the social recovery contact. Likewise, the CMS may transmit a set of social recovery authentication information to the social recovery contact using the social recovery contact information indicated by the security policy for the social recovery contact and may transmit a set of social recovery authentication information to the social recovery contact using the social recovery contact information indicated by the security policy for the social recovery contact.

In some embodiments, a set of social recovery authentication information may comprise a numeric code. For example, in some embodiments the set of social recovery authentication information transmitted to a social recovery contact 123 may comprise a six-digit number. In other embodiments, a different number of digits may be utilized, such as eight-digits, eleven-digits, etc. In some embodiments, the transmitted set of social recovery authentication information may comprise an alphanumeric passcode. For example, in some embodiments the set of social recovery authentication information transmitted to a social recovery contact 123 may comprise a six-character alphanumeric sequence. In other embodiments, a different number of characters may be utilized, such as eight letter words, nine letter words, etc.

After the sets of social recovery authentication information are sent to the social recovery contacts through their respective social recovery contact information, each of the social recovery contacts, as shown by block 204 of FIG. 2, may receive or otherwise obtain access to their respective sets of social recovery authentication information. For example, for a social recovery contact whose contact information is a phone number, the social recovery contact may receive the sets of social recovery authentication information through a smartphone device associated with that phone number. As another example, for a social recovery contact whose contact information is an email address, the social recovery contact may receive the sets of social recovery authentication information through an email received by a device (e.g., a smartphone, a tablet, a personal computer (PC), etc.) with access to the inbox associated with that email address.

After the sets of social recovery authentication information are received by the social recovery contacts, as shown by block 205 of FIG. 2, the social recovery contacts may provide their respective sets of social recovery authentication information to the owner of the user account. This may involve, for example, each social recovery contact communicating with the owner of the user account 114 to verify that the owner of the owner of the user account 118 initiated or otherwise authorized the key recovery request.

After the social recovery contacts transmit their respective sets of social recovery authentication information to the owner of the user account, as shown by block 206 of FIG. 2, the owner of the user account may receive the sets of social recovery authentication information. The owner of the user account may then transmit the received sets of social recovery authentication information to the CMS. For example, in some embodiments, the owner of the user account 118 may log into the user account 118 through the cryptocurrency management app 113. The cryptocurrency management app 113 may then provide the user with an interface to enter the social recovery verification codes. After the user has entered the social recovery verification codes, the cryptocurrency management app 113 may then transmit the entered social recovery verification codes from the MCD 104 to the CMS 105. Alternatively, in some embodiments the owner of the user account 118 may log into the user account 118 through an online web portal associated with the CMS 105. The online web portal may then provide the user with an interface to enter the social recovery verification codes. After the user has entered the social recovery verification codes, the online web portal associated may then transmit the entered social recovery verification codes from the device the online web portal is operating on to the CMS 105. In general, the social recovery verification codes may be transmitted to the MCD as part of a social recovery verification message.

Figure 3A:
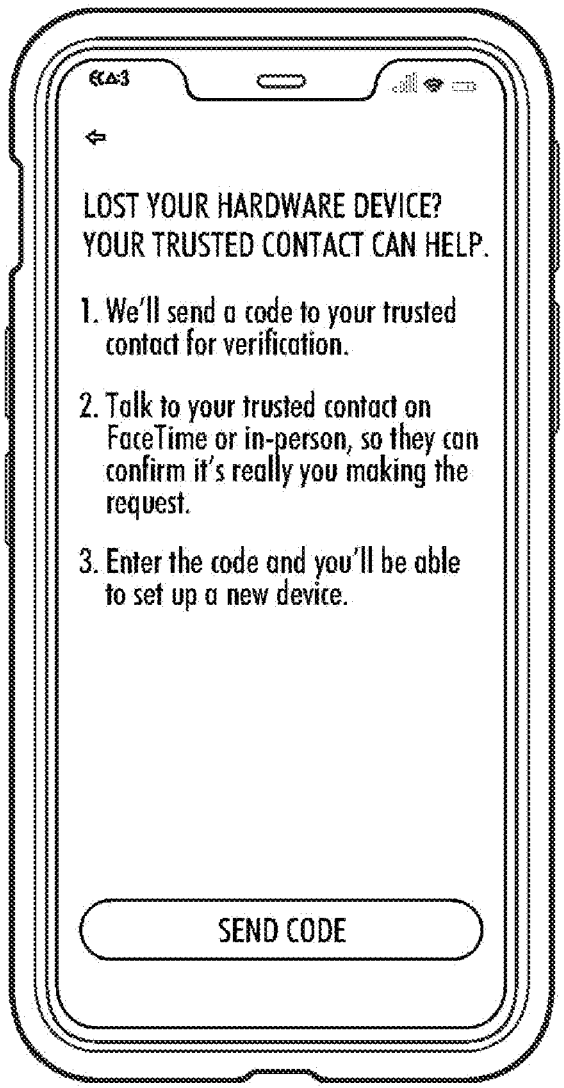
FIGS. 3A-B is an illustration of a graphic user interface (GUI) for using social recovery.
Figure 3B:
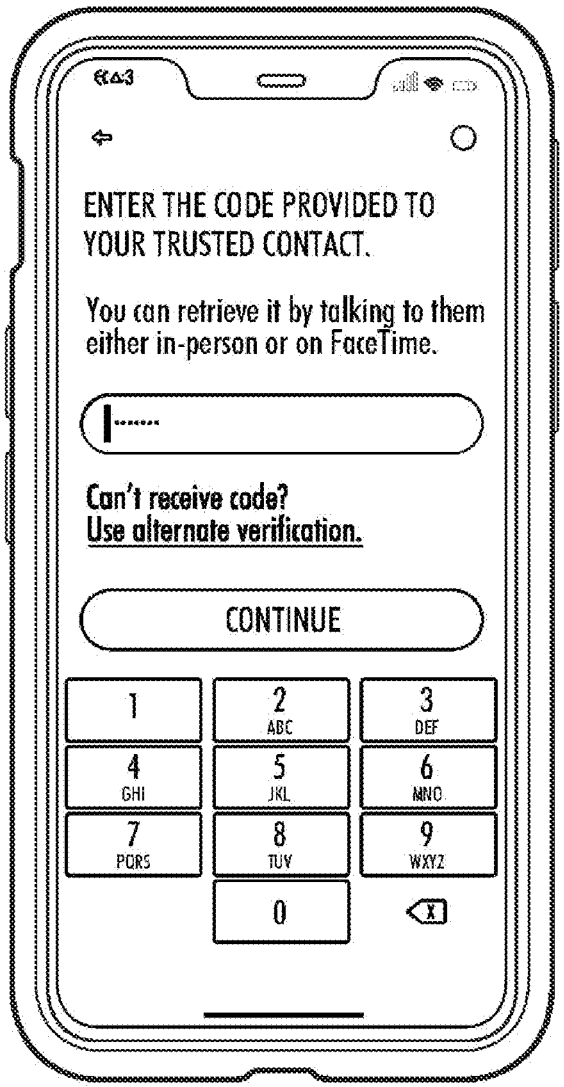

FIGS. 3A-B are illustrations of a graphic user interface (GUI) for using social recovery. As shown by the figures, an account owner may initiate the process of using social recovery to authenticate a backup key recovery request. In particular, as shown by FIG. 3A, the account owner may trigger the CMS 105 to transmit the social recovery authentication information to a social recovery contact specified in the security policy of the account. Here, the social recovery authentication information is shown as a four-digit numerical code. As shown by FIG. 3B, the account owner may then receive the numerical code from the social recovery contact—such as through having the social recovery contact verbally communicate the code over a video call—and input the received numerical code to complete the social recovery authentication process.

After the owner of the user account 114 transmits the social recovery verification codes to the CMS 105, as shown by block 207 of FIG. 2, the CMS 105 may receive and verify the transmitted social recovery verification codes. If (a sufficient number) of the social recovery verification codes provided by the owner of the user account 114 match the social recovery verification codes transmitted by the CMS 105 to the social recovery verification contacts 120, the CMS 105 may transmit the MCD backup encryption key 117 to the owner of the user account 114.

As shown by block 208 of FIG. 2, at some point, possibly before, during, or after any of the steps shown in blocks 202-207 of FIG. 2, the MCD 104 may retrieve the MCD private key encrypted backup 116 from the cloud server 115.

After the MCD 104 retrieves the MCD private key encrypted backup 116 and has obtained the MCD backup encryption key 117 transmitted by the CMS 105, as shown by block 209 of FIG. 2, the MCD 104 may recover the private key 110 by using the MCD backup encryption key 117 to decrypt the MCD private key encrypted backup 116.

Figure 4:
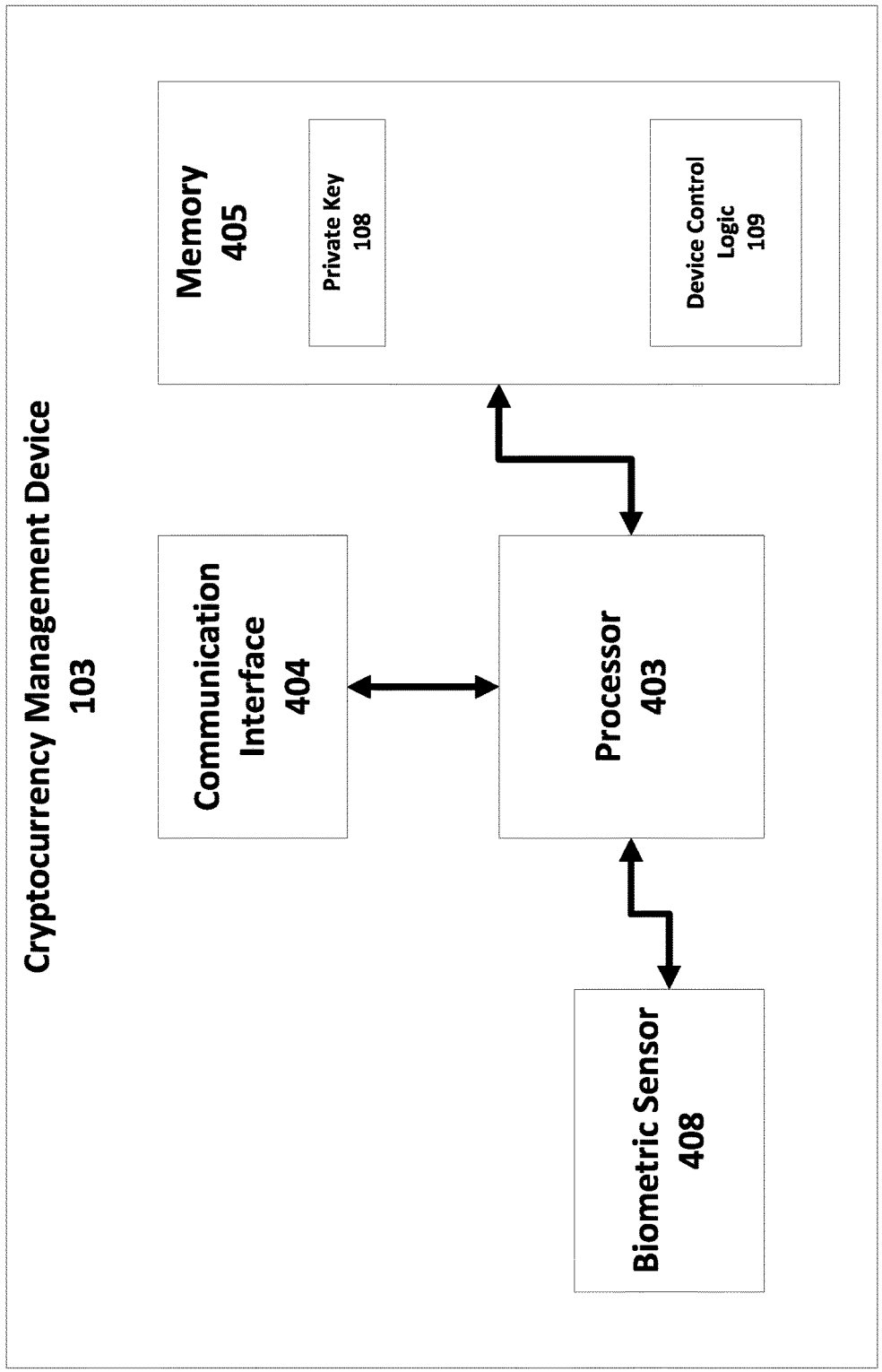
FIG. 4 is a block diagram of a cryptocurrency management device (CMD), such as is depicted by FIG. 1.

FIG. 4 is a block diagram of a cryptocurrency management device (CMD), such as the CMD 103 of FIG. 1. As shown by the figure, the CMD 103 may comprise at least one processor 403 that is connected to a communication interface 404 and a memory 405. The CMD 103 may be a stand-alone mobile device or other type of device, such as a desktop device that is not designed for mobility. In general, the processor 403 may interact and control these components, as well as other components of the CMD 103, to orchestrate the functioning of the device. The communication interface 404 may comprise circuitry that is configured to communicate with other devices over various communication channels.

For example, in some embodiments the communication interface 404 may allow communications over only a short-range, peer-to-peer communication channel (e.g., Bluetooth, Near Field Communication (NFC), or radio frequency identification (RFID)). Alternatively, in some embodiments the communication interface 404 may use networks such as the internet. As an example, the communication interface 404 may comprise modems, wireless radios (e.g., cellular transceivers), or other devices that are designed to wirelessly communicate with other devices or with network access points, such as cellular towers, network routers, Wi-Fi hots spots, or other types of access points. In general and as is relevant here, the communication interface 404 may be used to communicate with components of the cryptocurrency management system 102—such as the CMS 105 and the MCD 104—as well as with (particular nodes of) the cryptocurrency network 106.

Note that, in some embodiments, the CMD 103 is deliberately designed to enable only short-range communication, such as NFC or Bluetooth, or via a direct wired connection, so that hackers are unable to access the CMD 103 from a remote location using a network, thereby enhancing security of the CMD 103 and the data stored therein.

The memory 405 is connected to and editable by the processor 403. The memory 405 may store, among other things, a cryptocurrency account private key 108 and device control logic 109. As described further below, the private key 108 is a cryptographic key associated with the private key of the public-private key pair (the private key of one of the public-private key pairs, for multi-signature addresses) of a cryptocurrency address (e.g., cryptocurrency address 107). As also described further below, the device control logic 109 may contain instructions that can be executed by the processor 403 to perform various functions of the CMD 103 described herein, including the initiation of or processing for a transaction involving the cryptocurrency address 107.

In operation, the processor 403 may execute the instructions of the device control logic 109 to manage the cryptocurrency assets associated with the cryptocurrency address 107. This may involve communicating with the CMS 105 and the MCD 104 to obtain (or produce) authorizing signatures as well as communicating with (nodes of) the cryptocurrency network 106. To obtain signatures from the CMS 105 or the MCD 104, the processor 403 may interact with the communication interface 404 to communicate with the CMS 105 and the MCD 104.

Note that the device control logic 109 can be implemented in software, hardware, firmware or any combination thereof. In the exemplary CMD 103 illustrated by FIG. 4, the device control logic 109 is implemented in software and stored in the memory 405. When implemented in software, the device control logic 109 can be stored and transported on any computer-readable medium for use by or in connection with an instruction execution apparatus that can fetch and execute instructions, such as the processor 403. In the context of this document, a "computer-readable medium" can be any means that can contain or store a computer program for use by or in connection with an instruction execution apparatus.

In some embodiments the CMD 103 may have a biometric sensor 408 for authenticating an authorized user. For example, in some embodiments the biometric sensor 408 is a fingerprint sensor located on a surface of the CMD 103, but other types of biometric sensors 408 are possible in other examples. Other embodiments may not have a biometric sensor.

Note that, in some embodiments the CMD 103 may not have access the internet or some other form of wireless network. Rather, in some embodiments the CMD 103 may communicate only via short-range communication channels, requiring any devices seeking to interact with the CMD 103, such as the MCD 104, to be brought into close physical proximity (e.g., within several feet) to the CMD 103. Limiting the range of the CMD 103 helps to enhance security by preventing at least some attempts by unauthorized user to access the data stored in the CMD 103. Indeed, the CMD 103 may be kept for extended times in a secure location inaccessible to many hackers. When communication with the CMD 103 is desired, such as for authorization of a transaction involving the cryptocurrency managed by the CMD 103, the MCD 104 may be taken to the CMD 103.

In some embodiments, the CMD 103 may have a small, tag-like form factor that, among other things, allows the CMD 103 to be easily portable. When the CMD 103 is portable, it may be taken to a location associated with a transaction, such a location of a sale of product or service to be purchased by the cryptocurrency so that it is unnecessary to bring the MCD 104 to the secure location (e.g., home of the user) where the CMD 103 is normally kept. In other embodiments, the CMD 103 may have a larger, less portable form factor.

Figure 5:
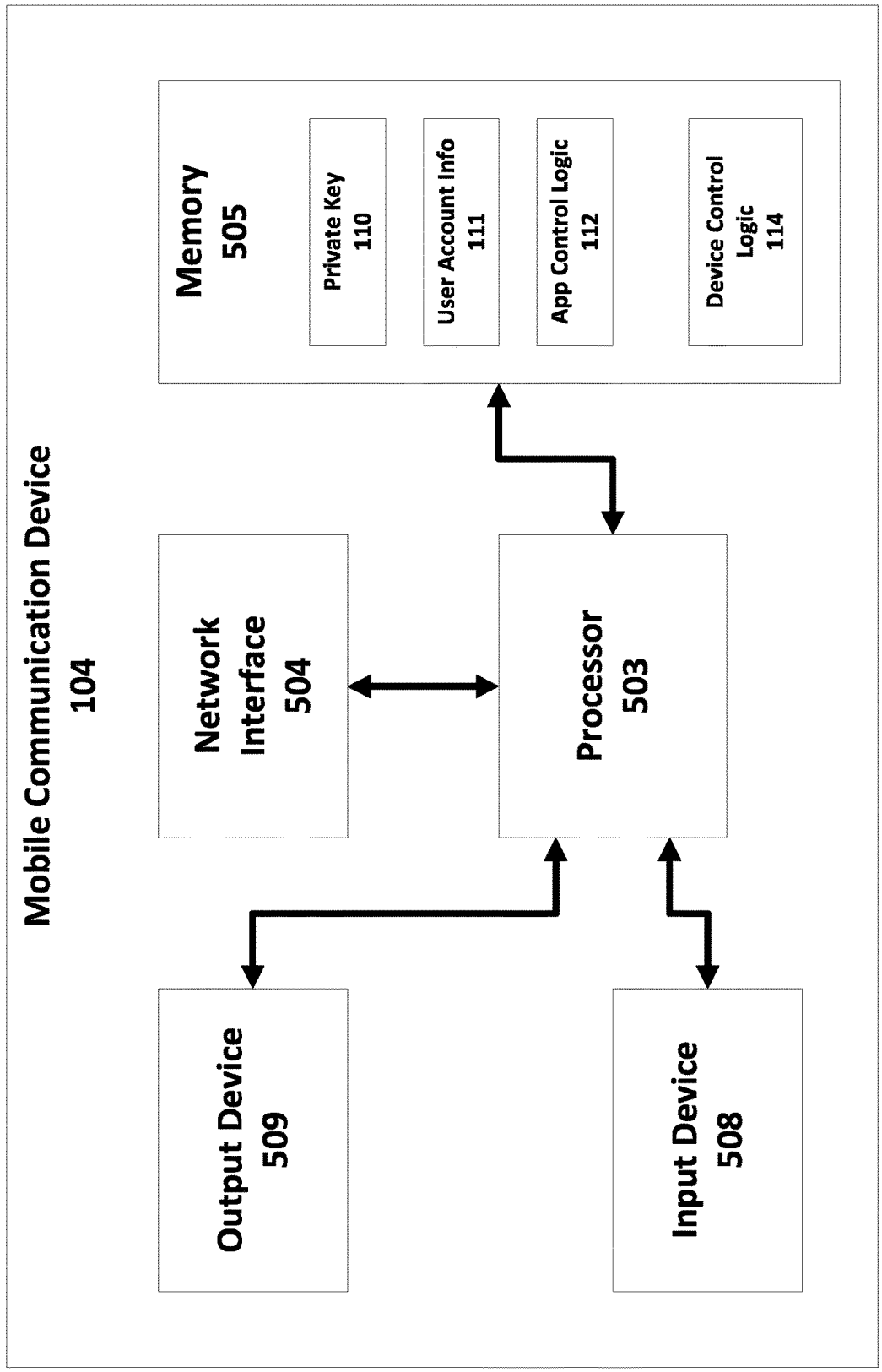
FIG. 5 is a block diagram of a mobile communication device (MCD), such as is depicted by FIG. 1.

FIG. 5 is a block diagram of a mobile communication device (MCD), such as the MCD 104 of FIG. 1. The MCD 104 may be implemented as a smartphone, but other types of MCDs 105 are possible, such as a laptop or other type of hand-held for example.

As shown by the figure, an MCD 104 may comprise at least one processor 503 that is connected to a network interface 504, and a memory 505. In general, the processor 503 may interact and control these components, as well as other components of the MCD 104, to orchestrate the functioning of the device. The network interface 504 may comprise circuitry configured to communicate with other devices over various networks, such as the internet. As an example, the network interface 504 may comprise modems, wireless radios (e.g., cellular transceivers), or other devices that are designed to communicate with network access points, such as cellular towers, network routers, Wi-Fi hots spots, or other types of access points.

Through these access points, the MCD 104 may communicate with various networks, such as a cellular network, Wi-Fi network, the Internet, or other networks or combinations of networks. Through these various networks, the MCD 104 may communicate with components of the cryptocurrency management system 102—such as the CMD 103 and the CMS 105—as well as with (particular nodes of) the cryptocurrency network 106). Any of the components of the cryptocurrency management system 102, including the MCD 104, may include other types of interfaces, such as a short-range communication interface. The MCD 104 may also include other types of interfaces. For example, in some embodiments the MCD 104 may include a short-range communication interface, such as a near field communication (NFC) or Bluetooth transceiver, for enabling wireless communication with other devices close to the MCD 104.

The memory 505 is connected to and editable by the processor 503. The memory 505 may store, among other things, a cryptocurrency account private key 110 and device control logic 114. As described further below, the private key 110 is a cryptographic key associated with the private key of the public-private key pair (the private key of one of the public-private key pairs, for multi-signature addresses) of a cryptocurrency address (e.g., cryptocurrency address 107).

As also described further below, the device control logic 114 may contain instructions that can be executed by the processor 503 to perform various functions of the MCD 104 described herein, including the initiation of or processing for a transaction involving the cryptocurrency address 107.

In operation, the processor 503 may execute the instructions of the device control logic 114 to manage the cryptocurrency assets associated with the cryptocurrency address 107. This may involve communicating with the CMD 103 and CMS 105 to obtain (or produce) authorizing signatures as well as communicating with (nodes of) the cryptocurrency network 106. To obtain signatures from the CMD 103 or CMS 105, the processor 503 may interact with the network interface 504 to communicate with the CMD 103 and CMS 105.

Note that the device control logic 114 can be implemented in software, hardware, firmware or any combination thereof. In the exemplary MCD 104 illustrated by FIG. 5, the device control logic 114 is implemented in software and stored in the memory 505. When implemented in software, the device control logic 114 can be stored and transported on any computer-readable medium for use by or in connection with an instruction execution apparatus that can fetch and execute instructions, such as the processor 503. Relatedly, in some embodiments the device control logic 114 may be part of a software application running on the MCD 104.

In some embodiments, the MCD 104 may also comprise an input device 508 and an output device 509. Generally speaking, the output device 503 is configured to communicate information to a user through some mechanism, such as a digital display. The processor 503 may interact with the output device 503 to transmit data to the user. Conversely, the input device 508 is configured to receive input from the user of the MCD 104. For example, the input device 508 may be a touch screen that is capable of receiving user input in the form of taps, gestures, and other physical interactions with the screen. As indicated by this example, the input device 508 and the output device 509 may, in some embodiments, comprise the same device (e.g., a touchscreen display). Additionally, in some embodiments, either or both of the input device 508 and the output device 509 may comprise more than one physical device.

Figure 6:
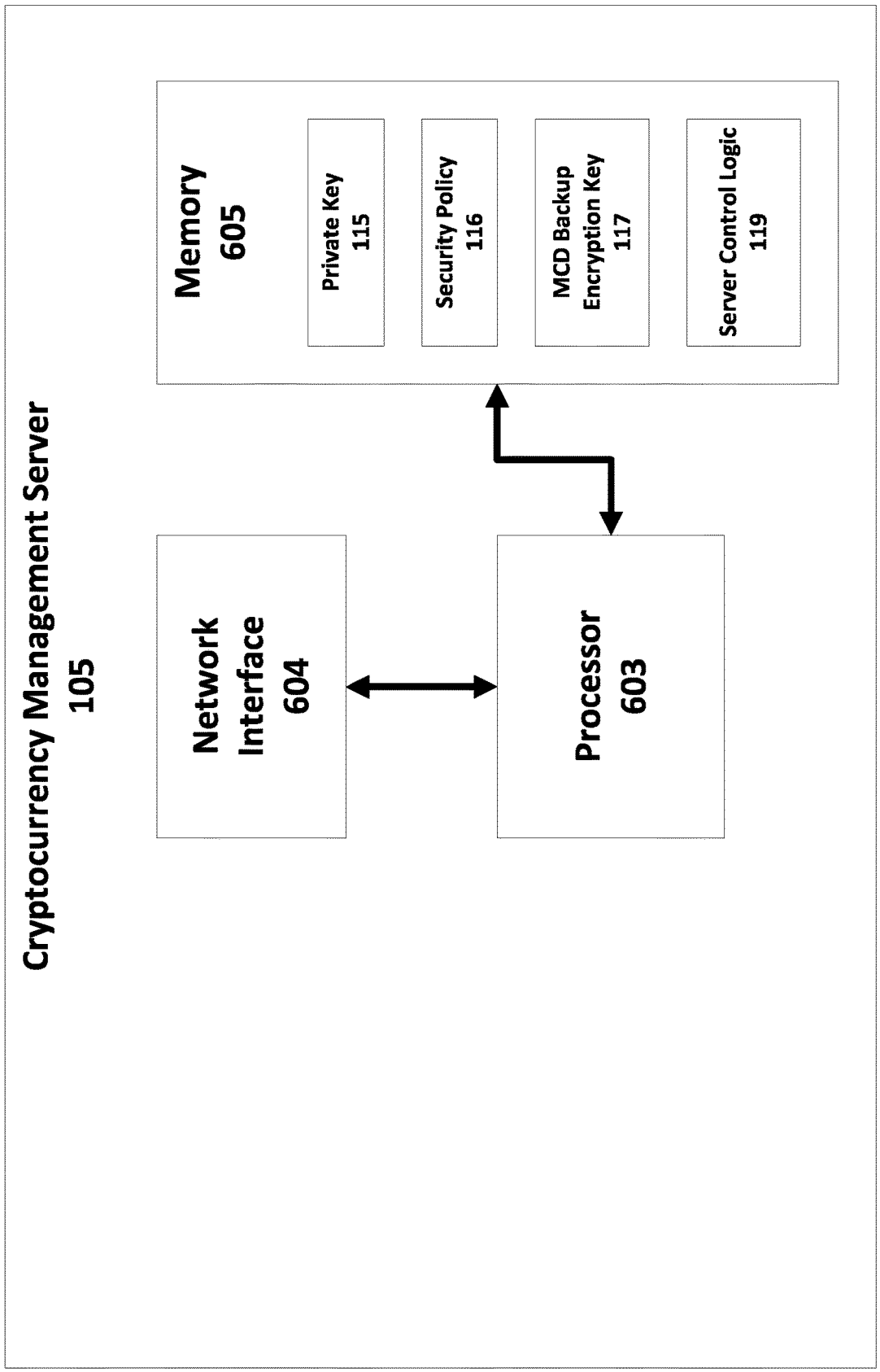
FIG. 6 is a block diagram of a cryptocurrency management server (CMS), such as is depicted by FIG. 1.

FIG. 6 is a block diagram of a cryptocurrency management server (CMS), such as the CMS 105 of FIG. 1. As shown by the figure, the CMS 105 may comprise at least one processor 603 that is connected to a network interface 604 and a memory 605. In general, the processor 603 may interact and control these components, as well as other components of the CMS 105, to orchestrate the functioning of the device. The network interface 604 may comprise circuitry configured to communicate with other devices over various networks, such as the internet. As an example, the network interface 604 may comprise modems, wireless radios (e.g., cellular transceivers), or other devices that are designed to communicate with network access points, such as cellular towers, network routers, Wi-Fi hots spots, or other types of access points. In general and as is relevant here, the network interface 604 may be used to communicate with components of the cryptocurrency management system 102—such as the CMD 103 and the MCD 104—as well as with (particular nodes of) the cryptocurrency network 106).

The memory 605 is connected to and editable by the processor 603. The memory 605 may store, among other things, a cryptocurrency account private key 115 and server control logic 119. As described further below, the private key 115 is a cryptographic key associated with the private key of the public-private key pair (the private key of one of the public-private key pairs, for multi-signature addresses) of a cryptocurrency address (e.g., cryptocurrency address 107). As also described further below, the server control logic 119 may contain instructions that can be executed by the processor 603 to perform various functions of the CMS 105 described herein, including the initiation of or processing for a transaction involving the cryptocurrency address 107.

In operation, the processor 603 may execute the instructions of the server control logic 119 to manage the cryptocurrency assets associated with the cryptocurrency address 107. This may involve communicating with the CMD 103 and the MCD 104 to obtain (or produce) authorizing signatures as well as communicating with (nodes of) the cryptocurrency network 106. To obtain signatures from the CMD 103 or the MCD 104, the processor 603 may interact with the network interface 604 to communicate with the CMD 103 and the MCD 104.

Note that the server control logic 119 can be implemented in software, hardware, firmware or any combination thereof. In the exemplary CMS 105 illustrated by FIG. 6, the server control logic 119 is implemented in software and stored in the memory 605. When implemented in software, the server control logic 119 can be stored and transported on any computer-readable medium for use by or in connection with an instruction execution apparatus that can fetch and execute instructions, such as the processor 603.

Figure 7:
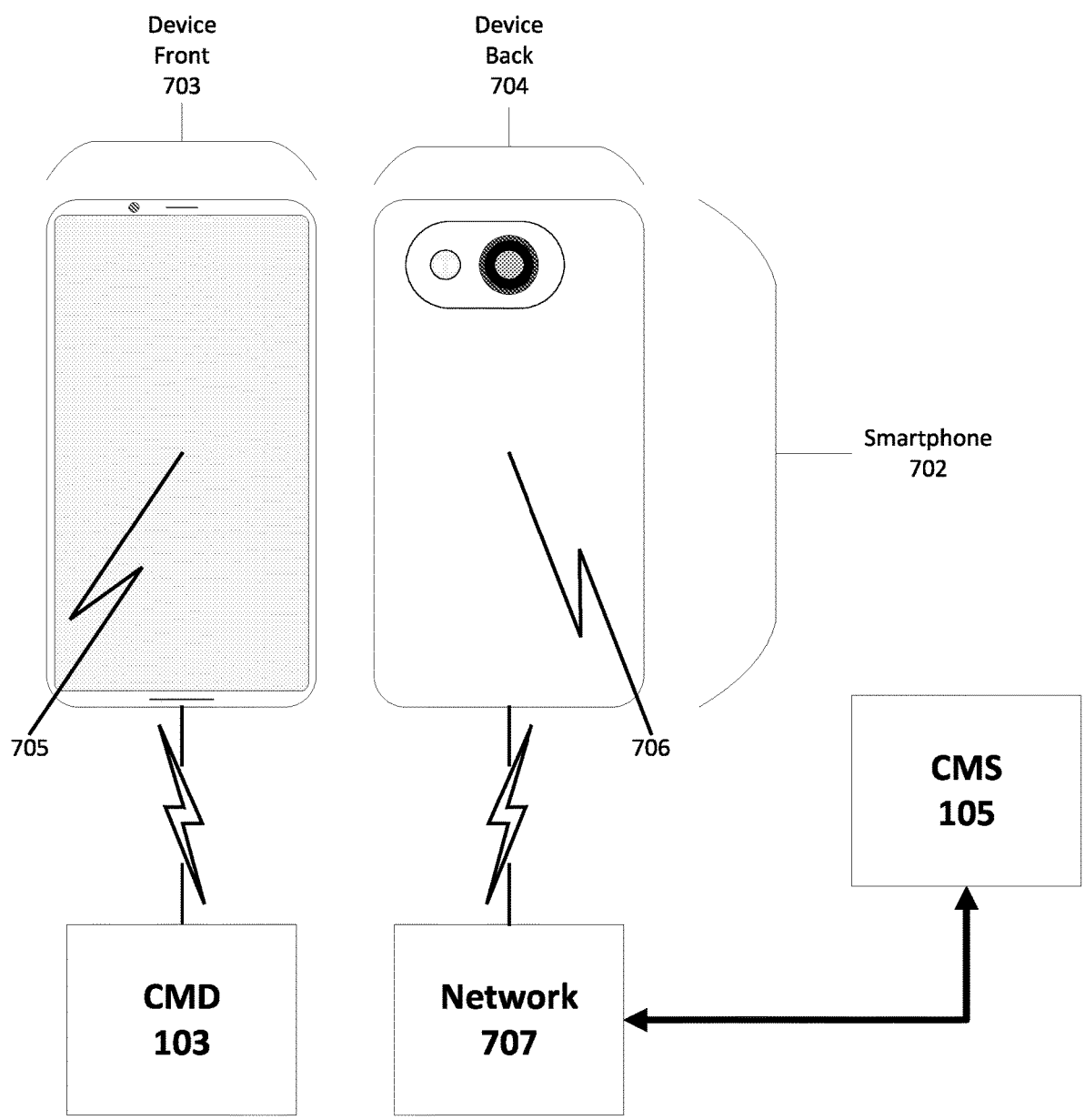
FIG. 7 is a diagram illustrating a front view and back view of an exemplary mobile communication device, such as is depicted in FIG. 5.

FIG. 7 is an illustration of an exemplary MCD having a digital screen as previously described. Specifically, the MCD 702 of FIG. 7 (also referred to as the smartphone 702) is implemented as a smartphone having a touch screen 705 on one side of the device (i.e., device front 703) and a camera 706 on the opposite side (i.e., device back 704). The touch screen 705 covers much of the device's front side 703 and implements both the input device 508 and the output device 509 of FIG. 5. The touch screen 705 is capable of giving output by displaying images and video. The touch screen 705 is also capable of receiving user input in the form of taps, gestures, and other physical interactions with the screen. Not shown are the processor and memory internal to the MCD 702 but which function similarly to the processor 503 and the memory 505 of FIG. 5.

During the recovery period, where a user has initiated a key recovery with the CMS 105 but has not yet completed the process, additional security procedures may be engaged by the CMS 105. As background, when a key is permanently lost, the two remaining keys may still be used to generate transactions. If desired, during the recovery process, various constraints, such as spending limits may be enforced to permit use of least some funds until the recovery process is completed. If desired, during the recovery process, various constraints, such as spending limits may be enforced to permit use of least some funds until the recovery process is completed.

For example, in some embodiments, the system 102 is configured to implement a process, referred to hereafter as "Delay and Notification Process" for transactions during the recovery process. In this regard, once a notification of a permanently lost key is received, the system 102 is configured to delay transactions and provide notifications of the transactions during the delay so that the authorized user can take steps to stop or prevent unauthorized transactions. For example, in the embodiment described above where the CMD 103 is permanently lost, the application on the MCD 104 may be configured to permit at least some transactions during the recovery period, such as transactions within certain predefined spending limits. However, when a transaction is requested, the MCD 104 is configured to delay sending a fully authenticated request to the cryptocurrency network 106 for at least a predefined amount of time in order to allow the authorized user to cancel the transaction before the request is sent to the network 106.

In some embodiments, the CMS 105 may request a plurality of social recovery contacts to provide a valid code rather than a single social recovery contact in an effort to provide additional security. Additionally, some embodiments may employ, until the recovery process is complete, the Delay and Notification Process described above. This may be used to enable the authorized user to cancel any fraudulent transactions that may be attempted during the recovery process. Thus, rather than rely on passwords and PINs for recovery, the system 102 allows the authorized user to use social recovery contacts to help authenticate the user for key recovery, although it is possible for the system 102 to use passwords and PINs as well, if desired.

Note that the system 102 may permit the authorized user to list a plurality of social recovery contacts and allow recovery if a minimum number of the social recovery contacts provide valid codes where the minimum number is less than the total number of social recovery contacts. As an example, the user may define x number of social recovery contacts, and the CMS 105 may provide its stored key for recovery if any of at least y social recovery contacts provide a valid code, wherein y is less than x. Thus, recovery is permitted even if less than all of the social recovery contacts are available for verification.

In addition, the application of the MCD 104 is configured to send one or more notifications of the transaction request to a trusted destination, such as phone number or email address, that is established by the authorized user during registration or updated by the authorized user. Such notification may include details of the requested transaction, information regarding steps that the user may take to cancel the transaction, and the amount of time remaining in the delay window until the transaction will be submitted to the cryptocurrency network 106. Thus, if a fraudulent transaction is requested, the authorized user should receive notification of the fraudulent request and information on steps that the user may take to cancel the request before it is submitted to the cryptocurrency network 106. If the delay window expires without the authorized user taking such steps to cancel the request, then the application on the MCD 104 may be configured to submit the transaction request to the cryptocurrency network 106. Thus, during the recovery process, the authorized user should be given notification of requested transactions and sufficient time to take steps to prevent fraudulent transactions before they are sent to the cryptocurrency network 106 for processing.

Figure 8:
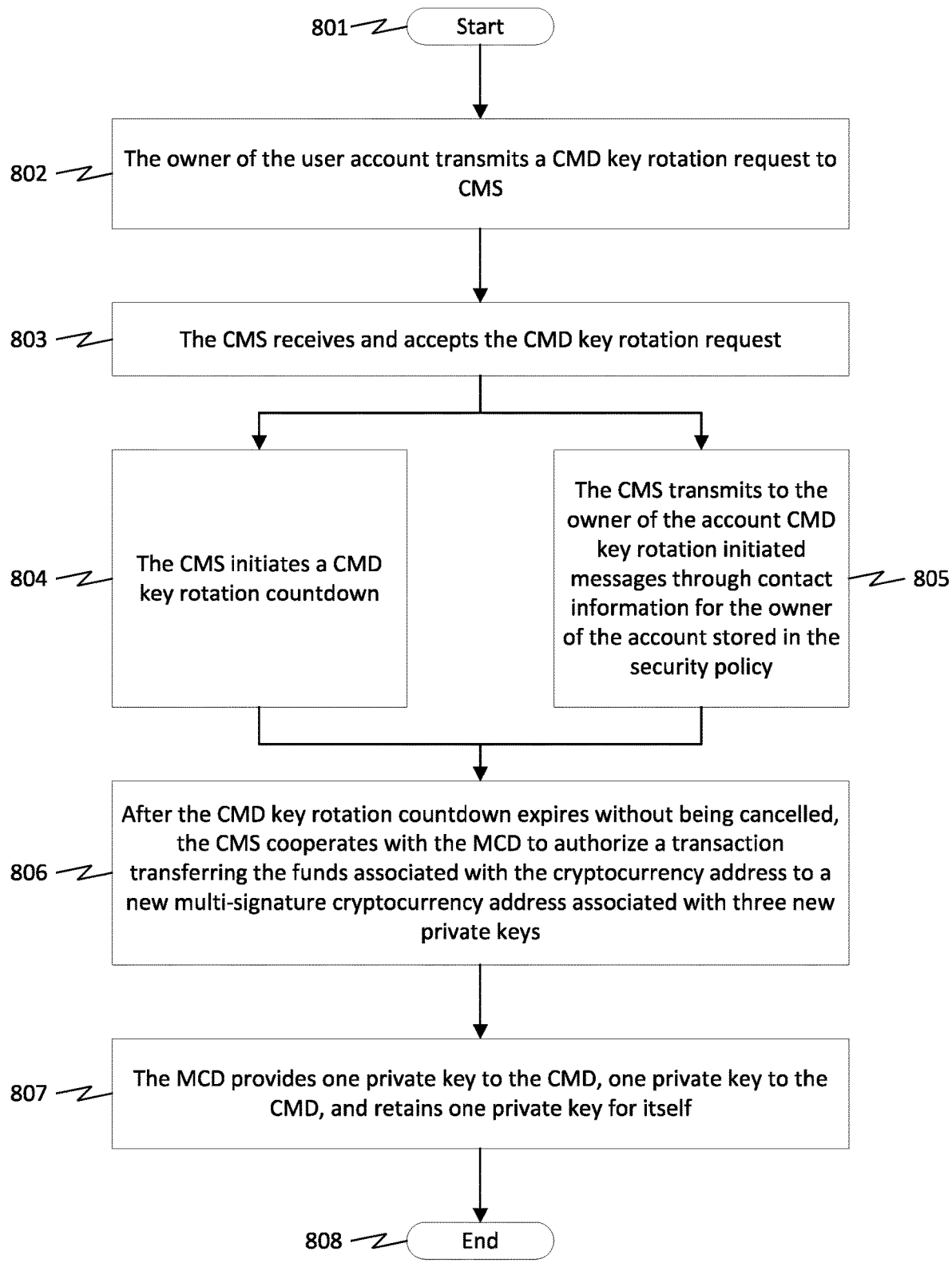
FIG. 8 is a flowchart of an exemplary method of using delay and notify.

FIG. 8 is a flowchart illustrating a process of recovering a lost private key 108 using delay and notify, as just described. For example, the process may be used after a user to activate a new CMD 103 after access to the previous CMD 103 is lost.

To start, as shown by block 802 of FIG. 8, the owner of the user account may interact with the CMS to transmit a CMD key rotation request to the CMS. In some embodiments, this may involve the user logging into the user account 118 through the cryptocurrency management app 113, with the cryptocurrency management app 113 then transmitting the CMD key rotation request from the MCD 104 to the CMS 105. Alternatively, in some embodiments the user may log into the user account 118 through an online web portal associated with the CMS 105 and transmitting the CMD key rotation request to the CMS 105 through this web portal. In some embodiments, the CMS 105 may require the user to provide authenticating information indicating the request is from the owner of the user account 118 before acting on the CMD key rotation request. For example, in some embodiments the CMS 105 may require the user to provide the login credentials used to access the user account 118 (e.g., a username and password). As another example, the CMS 105 may require the user to generate valid signature of a hash of data provided to the user by the CMS 105 using one of the private keys associated with the cryptocurrency address 107, such as the private key 110. The CMS 105 may then use the corresponding public key to verify the authenticity of the signature and—by also hashing the data it provided to the user—verify that the signature is for the hash sent to the user.

After the key recovery request is transmitted, as shown by block 803 of FIG. 8, the CMS may receive and then verify the CMD key rotation request. This may involve, for example, the CMS verifying that the CMD key rotation request includes required authentication information.

After receiving and verifying the CMD key rotation request, as shown by block 804 of FIG. 8, the CMS may initiate a CMD key rotation countdown according to the security policy of the user account.

Additionally, after receiving and verifying the CMD key rotation request, as shown by block 805 of FIG. 8, the CMS may transmit to the owner of the account CMD key rotation-initiated messages through contact information for the owner of the account stored in the security policy.

After the CMD key rotation countdown expires without being cancelled, as shown by block 806 of FIG. 8, the CMS cooperates with the MCD to authorize a transaction transferring the funds associated with the cryptocurrency address to a new multi-signature cryptocurrency address secured by the private keys of the CMS, MCD, and the replacement CMD. For example, in some implementations, the MCD 104 may receive the public key of the replacement CMD and generate a transaction that moves the funds to a multi-signature cryptocurrency address that corresponds to the existing public keys of the CMS 105 and the MCD 104 and the new public key of the replacement CMD, sign with its own private key, and then have the replacement CMD and CMS 105 sign with their corresponding private keys so that only the private key of the replacement CMD is replaced. In another example, the CMS 105 and MCD 104 may each generate a new public/private key pair, the CMS 105 may send its new public key to the MCD 104, the MCD may receive the new public key of the replacement CMD and generate a transaction that moves the funds to a multi-signature cryptocurrency address that corresponds to the new public keys of the CMS 105, the MCD 104 the replacement CMD, sign with its own new private key, and then have the replacement CMD and CMS 105 sign with their corresponding private keys so that only the private key of the replacement CMD is replaced.

After the funds associated with the cryptocurrency address are transferred to the new multi-signature cryptocurrency address, as shown by block 807 of FIG. 8.

In some implementations, the MCD 104 and CMD 103 may work together to generate an authorization token that the CMS 105 may use to determine whether changes may be made to a user's security policy. The MCD 104 sign an authorization token with its private key and also have the CMD 103 sign the authorization token, store the token, and then transmit the authorization token to the CMS 105 whenever the MCD 104 is requesting a change in a security policy based on input from a user. For example, the user may request the spending limit be increased and the MCD 104 may then send a request for the increase along with the authorization token. The CMS 105 may authenticate that the authorization token is valid based on the public keys of the MCD 104 and the CMD 103 before completing the request.

In some implementations, the authorization token may also be used in a delay and notify and notify process. For example, where a thief steals a user's MCD 104 and is attempting to pair the MCD 104 with a different CMD. The CMS 105 may permit a MCD 104 that holds the most recently generated authorization token to initiate the delay and notify process once. If the delay and notify process is canceled, or the CMS 105 sees that another MCD has a more recently generated authorization token, the CMS 105 may require additional verification to initiate the delay and notify process. For example, the CMS 105 may require that a customer service agent provide a manual approval after the agent has received sufficiently authentication information from a user of the MCD making the request. The use of the authorization token in such a way may allow the CMS 105 to automatically prevent a thief from initiating multiple delay and notify requests using a stolen MCD 104.

In some implementations, the MCD backup encryption key 117 may be encrypted using a public-key cryptographic scheme where the corresponding private keys are known or otherwise accessible by the social recovery contacts. Specifically, a public-key encryption system may be employed using pairs of public and private keys, where public keys are used to encrypt information and private keys are used to decrypt information. At a broad level, each of the social recovery contacts may have a device associated with a pair of public and private keys. The public key may be used to encrypt information about the MCD backup encryption key 117, requiring the corresponding private key to later decrypt. This may require the participation of the social recovery contact's device, which may be configured to require the approval of the social recovery contact. Finally, this in turn may involve the owner of the user account 118 communicating with the social recovery contact in a social recovery process like the one described above.

For example, in one implementation, when the owner of the user account 118 provides the social recovery contact information 124 for the social recovery contacts 120, the CMS 105 may utilize the social recovery contact information 124 to communicate with (a device of) the social recovery contacts 120. Subsequently, the CMS 105 may prompt the social recovery contacts 120 to download and install an application on their electronic devices. After the applications are installed, the CMS 105 may interaction with the applications—specifically, the instances of the application running on each social recovery contact's respective device—to cause the applications to each generate a public/private key pair and then transmit the public key of each key pair to the CMS 105. After receiving these public keys, the CMS 105 may then forward the public keys to the MCD 104. After receiving the public keys from the CMS 105, the MCD 104 may utilize the public keys to encrypt the MCD backup encryption key 117 such that a (possibly improper) subset of the corresponding private keys is needed to decrypt the encrypted MCD backup encryption key 117.

For instance, in one embodiment the MCD 104 may employ a secret sharing scheme (e.g., Shamir's secret sharing scheme, Blakley's secret sharing scheme, etc.) to split the MCD backup encryption key 117 into a number of "shares" equal to the number of public keys. The secret sharing scheme distributes information among the shares such that a threshold number of the shares may be used to recover the original unencrypted MCD backup encryption key 117. Each of these shares may be assigned to one of the public keys and then encrypted using that public key, yielding an encrypted share. This encrypted share must be decrypted by the corresponding private key before it can be used with other (decrypted) shares to recover the MCD backup encryption key 117. The MCD 104 may store these encrypted shares in a cloud backup accessible to the MCD 104.

For example, if the owner of the user account 118 lists social recovery contacts 121, 122, and 123 as his only social recovery contacts, The MCD 104 may receive three public keys, one for each of the three social recovery contacts. The MCD 104 may be configured to utilize a secret sharing technique to split the MCD backup encryption key 117 into three shares where any two of the shares may be used to recover the MCD backup encryption key 117.

these three public keys to generate encrypted shares where any two of the three shares—after being decrypted by their associated public keys' corresponding private key— may be used to recover MCD backup encryption key 117 the MCD 104 may then associate each share with one of the social recovery contacts 121, 122, and 123—the shares associated with different social recovery contacts—and encrypt the three shares with the public key corresponding to their associated social recovery contact. The MCD 104 may then store these three encrypted shares in a cloud backup accessible to the MCD 104.

In this implementation, when social recovery is initiated, the MCD 104 may download the corresponding encrypted shares of the MCD backup encryption key 117 and transmit those encrypted shares to the CMS 105. After it receives the encrypted shares, the CMS 105 may identify which of the social recovery contacts 120 each of the encrypted shares are associated with and then send the encrypted shares to the corresponding applications of the social recovery contacts 120. The applications of the social recovery contacts 120 may then prompt the social recovery contacts 120 to confirm the owner of the user account 118 contacted them for recovery. The applications, after receiving confirmation from their corresponding social recovery contacts, may each decrypt their respective encrypted shares with their private key (i.e., the private key from the same key pair as the public key initially transmitted to the CMS 105) and transmit their decrypted shares to the CMS 105. The CMS 105 may then reconstitute the MCD backup encryption key 117 once it receives sufficient number of decrypted shares. After it has reconstituted the MCS backup encryption key 117, the CMS 105 may transmit the now reconstituted MCD backup encryption key 117 to the MCD 104.

Note that, in some implementations, instead of transmitting a reconstituted MCD backup encryption key to the MCD 104, the CMS 105 may instead forward the decrypted shares to the MCD 104. After receiving these decrypted shares, he MCD 104 may then itself reconstitute the MCD backup encryption key 117. In yet other implementations, access to the MCD backup encryption key 117 may be limited from the MCD backup encryption key 117 by having the applications on the devices of the social recovery contacts 102 encrypt the decrypted shares with another public key that has a corresponding private key that is known to the MCD 104 but not to the CMS 105. This may allow the MCD 104 to decrypt using the now re-encrypted secrets shares and then reconstitute the MCD backup encryption key 117 while not allowing the CMS 105 to do the same.

Note that, in general, "communicating" with one of the social recovery contacts 120 using the social recovery contact information 124 may refer to either communicating with one of the social recovery contact's electronic devices or it may refer to communicating with the social recovery contact themselves (with the electronic device being a likely medium facilitating this communication). Broadly speaking, "communicating" refers to communicating with electronic devices for functional tasks such as generating and distributing cryptographic keys. When used to refer to permission or assent or to request information, "communicating" generally refers to "communicating" with the social recovery contact himself.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The devices, modules, and other functional units described in this disclosure can be implemented by hardware, or software, or a combination of hardware and software. In some embodiments, functions described as being implemented in hardware may instead be implemented in software or a combination of hardware and software. Likewise, in some embodiments, functions described as being implemented in software may instead be implemented in hardware or a combination of hardware and software. If something is implemented by software, it may be stored in a non-transitory computer-readable media, like the computer-readable media described above. Such software, when executed by a processor, may perform the function of the device, module or other functional unit the software is implementing. The above-described devices, modules, and other functions units may also be combined or may be further divided into a plurality of sub-units.

In some places reference is made to standards, including standard methods of performing some task. These standards are revised from time to time, and, unless explicitly stated otherwise, reference to standards in this disclosure refer to the most recent published standard as of the time of filing.

Spatially relative terms, such as "under", "below", "lower", "over", "upper" and the like, may be used herein for ease of description to describe one element or feature's relationship to another when the apparatus is right side up.

When a feature is referred to as being "on" another feature, the feature may be directly on the other feature with no intervening features present or it may be indirectly on the other feature with intervening features being present. In contrast, when a feature is referred to as being "directly on" another feature, the feature is directly on the other feature with no intervening features present. It will also be understood that, when a feature is referred to as being "connected", "attached" or "coupled" to another feature, the feature may be directly connected, attached or coupled to the other feature with no intervening features present or it may be indirectly connected, attached or coupled to the other feature with intervening features being present. In contrast, when a feature is referred to as being "directly connected", "directly attached" or "directly coupled" to another feature, the feature is directly connected, directly attached, or directly coupled to the other feature with not intervening features present.

The terms "about" and "approximately" shall generally mean an acceptable degree of error or variation for the quantity measured given the nature or precision of the measurements. Typical, exemplary degrees of error or variation are within 20%, preferably within 10%, more preferably within 5%, and still more preferably within 1% of a given value or range of values. Numerical quantities given in this description are approximate unless stated otherwise, meaning that the term "about" or "approximately" can be inferred when not expressly stated.

Ordinal numbers or terms such as "first" and "second" are used only to differentiate an entity or operation from another entity or operation, and do not require or imply any actual relationship or sequence between these entities or operations. Thus, a first feature or element could be termed a second feature or element, and similarly, a second feature or element could be termed a first feature or element without departing from the teachings of the present disclosure. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the terms "or" and "at least one of" encompasses all possible combinations, except where infeasible. For example, if it is stated that a component may include "A or B," then, unless specifically stated otherwise or infeasible, the component may include "A," "B," or "A and B." As a second example, if it is stated that a component includes "at least one of A, B, or C," then, unless specifically stated otherwise or infeasible, the component may include "A," "B," "C," "A and B," "A and C," "B and C," or "A, B, and C." This same construction applies to longer lists (e.g., "may include A, B, C, or D").

As used herein, the singular forms "a", "an," and "the" are intended to include the plural forms as well, unless the context clearly indicates otherwise.

Any statements in this disclosure criticizing or disparaging aspects of the prior art are not intended to indicate that what is claimed excludes any of those criticized or disparaged aspects of the prior art.

Any given element or step of the embodiments disclosed above may be embodied in a single element or step or may be embodied in multiple elements or steps. Moreover, any given element or step of the embodiments disclosed above may be combined and embodied in single element or step or may be combined and embodied in multiple elements or steps.

The sequence of steps shown in the various figures are only for illustrative purposes and do not necessarily indicate that embodiments of the present disclosure are limited to any particular sequence of steps. As such, steps performed by various embodiments of the present disclosure can be performed in a different order while implementing the same method.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

Embodiments of the present disclosure can be implemented at least according to the following clauses:

Clause 1: A cryptocurrency management system, comprising: a mobile communication device (MCD) configured to: generate, based on a first private key stored by the MCD, a first authenticating signature for use in authenticating transactions involving a cryptocurrency multi-signature address of a cryptocurrency network; and store, in a cloud server associated with the MCD, an encrypted backup of the first private key, wherein the encrypted backup of the first private key is encrypted using an MCD backup encryption key provided to a cryptocurrency management server (CMS); and the cryptocurrency management server (CMS) configured to: generate, based on a second private key stored by the CMS, a second authenticating signature for use in authenticating transactions involving the cryptocurrency multi-signature address of the cryptocurrency network, wherein the second private key is associated with a first user account of a first user on the CMS; receive an MCD backup key request, the MCD backup key recovery request configured to initiate, according to a security policy of the first user account for the cryptocurrency multi-signature address, a process for providing the MCD backup encryption key to the first user; responsive to receiving the MCD backup key request, verifying the MCD backup key request originated from the first user by either: transmitting to the first user one or more sets of social recovery authentication information, wherein each of the one or more sets of social recovery authentication information is associated with a corresponding social recovery contact from a collection of one or more social recovery contacts indicated by the security policy; and receiving one or more social recovery verification messages that each indicate a corresponding social recovery contact confirms the MCD backup key request originated from the first user, wherein each of the one or more social recovery verification messages is received from the corresponding social recovery contact and is based on the set of social recovery authentication information associated with the corresponding social recovery contact; or transmitting, to a collection of one or more social recovery contacts indicated by the security policy, one or more sets of social recovery authentication information, wherein each of the one or more sets of social recovery authentication information is associated with a corresponding social recovery contact from the collection of one or more social recovery contacts; and receiving one or more social recovery verification messages that each indicate a corresponding social recovery contact confirms the MCD backup key request originated from the first user, wherein each of the one or more social recovery verification messages is based on the set of authentication information associated with the corresponding social recovery contact; and responsive to receiving the one or more social recovery verification messages and verifying the MCD backup key request originated from the first user, transmitting to the first user the MCD backup encryption key.

Clause 2: A system of clause 1, wherein the MCD is further configured to: retrieve, from the cloud server associated with the MCD, the encrypted backup of the first private key; and recover the first private key by decrypting the retrieved encrypted backup of the first private key using the MCD backup encryption key transmitted by the CMS to the first user.

Clause 3: The cryptocurrency management system of clause 1, wherein the CMS is further configured to: process the one or more received social recovery verification messages to verify each received social verification message is based on a set of social recovery authentication information comprising the social recovery verification message corresponds to a set of social recovery authentication information of a corresponding social recovery contact; and transmitting to the first user the MCD backup encryption key in response to verifying that each of the one or more received social verification messages are based on respective sets of social recovery authentication information associated with corresponding social recovery contacts.

Clause 4: The cryptocurrency management system of clause 1, wherein: the sets of social recovery information transmitted by the CMS comprises at least a first number of sets of social recovery authentication information; and the received one or more social recovery verification messages comprises one or more social recovery verification messages that are collectively based on at least a second number of sets of social recovery authentication information, wherein: the second number is less than or equal to the first number; and each of the at least second number of sets of social recovery authentication information are associated with different social recovery contacts.

Clause 5: The cryptocurrency management system of clause 1, wherein: the CMS and the first user account are associated with a first online platform; and the MCD backup key request is generated by using the first user account to access the first online platform.

Clause 6: The cryptocurrency management system of clause 5, wherein: the one or more social recovery verification messages are received from the first user; each of the one or more received social recovery verification messages comprises information based on a password associated with logging into the first user account; and the CMS is further configured to process the one or more received social recovery verification messages to verify each received social verification message is based on the information derived from the password associated with the first user account.

Clause 7: The cryptocurrency management system of clause 1, wherein the CMS is further configured to: receive a transaction request involving one or more cryptocurrency tokens associated with the cryptocurrency multi-signature address, wherein the transaction request comprises either the first authenticating signature or the second authenticating signature; responsive to receiving the transaction request, generate an authenticated transaction using the third authenticating signature and either the first authenticating signature or the second authenticating signature; and submit the authenticated transaction to the cryptocurrency network.

Clause 8: The cryptocurrency management system of clause 7, wherein: the transaction request comprises authenticating information indicating the transaction request is from the first user; and the CMS is further configured to: process the transaction request to verify the authenticating information; and generate the authenticated transaction in response to verifying the authenticating information.

Clause 9: The cryptocurrency management system of clause 8, wherein the CMS is further configured to: process the transaction request to determine if the transaction request conforms to a transaction policy of the first user account for the cryptocurrency multi-signature address; and generate the authenticated transaction in response to determining the transaction request conforms to the transaction policy.

Clause 10: The cryptocurrency management system of clause 9, wherein the transaction policy required the initiated transaction to be less than a certain amount of value.

Clause 11: A method for managing cryptocurrency, comprising: generating, based on a first private key stored by a cryptocurrency management server (CMS), a first authenticating signature for use in authenticating transactions involving a cryptocurrency multi-signature address of a cryptocurrency network, wherein the first private key is associated with a first user account of a first user on the CMS; receiving a mobile communication device (MCD) backup key request, the MCD backup key request configured to initiate, according to a security policy of the first user account for the cryptocurrency multi-signature address, a process for providing an MCD backup encryption key to the first user, wherein: the second private key is stored by an MCD configured to use the second private key to generate a second authenticating signature for use in authenticating transactions involving the cryptocurrency multi-signature address of the cryptocurrency network; the MCD is further configured to store an encrypted copy of the second private key in a cloud server associated with the MCD, wherein the encrypted copy of the second private key is encrypted using the MCD backup encryption key; and the third private key is stored by a cryptocurrency management device (CMD) configured to use the third private key to generate a third authenticating signature for use in authenticating transactions involving the cryptocurrency multi-signature address of the cryptocurrency network; responsive to receiving the MCD backup key request, verifying the MCD backup key request originated from the first user by either: transmitting to the first user one or more sets of social recovery authentication information, wherein each of the one or more sets of social recovery authentication information is associated with a corresponding social recovery contact from a collection of one or more social recovery contacts indicated by the security policy; and receiving one or more social recovery verification messages that each indicate a corresponding social recovery contact confirms the MCD backup key request originated from the first user, wherein each of the one or more social recovery verification messages is received from the corresponding social recovery contact and is based on the set of social recovery authentication information associated with the corresponding social recovery contact; or transmitting, to a collection of one or more social recovery contacts indicated by the security policy, one or more sets of social recovery authentication information, wherein each of the one or more sets of social recovery authentication information is associated with a corresponding social recovery contact from the collection of one or more social recovery contacts; and receiving one or more social recovery verification messages that each indicate a corresponding social recovery contact confirms the MCD backup key request originated from the first user, wherein each of the one or more social recovery verification messages is based on the set of authentication information associated with the corresponding social recovery contact; and responsive to receiving the one or more social recovery verification messages and verifying the MCD backup key request originated from the first user, transmitting the MCD backup encryption key to the first user.

Clause 12: The method of clause 11, further comprising: retrieving, by the MCD, the encrypted backup of the second private key from the cloud server associated with the MCD; and recovering, by the MCD, the second private key, wherein the MCD recovers the second private key by decrypting the retrieved encrypted backup of the second private key using the MCD backup encryption key transmitted by the CMS to the first user.

Clause 13: The method of clause 11, wherein: transmitting the sets of social recovery authentication information comprises transmitting at least a first number of sets of social recovery authentication information; and receiving the one or more social recovery verification messages comprises receiving one or more social recovery verification messages that are collectively based on at least a second number of sets of social recovery authentication information, wherein: the second number is less than or equal to the first number; and each of the at least second number of sets of social recovery authentication information are associated with different social recovery contacts.

Clause 14: The method of clause 11, further comprising: processing the one or more received social recovery verification messages to verify each received social verification message is based on a set of social recovery authentication information of a corresponding social recovery contact; and transmitting to the first user the MCD backup encryption key in response to verifying that each of the one or more received social verification messages are based on respective sets of social recovery authentication information associated with corresponding social recovery contacts.

Clause 15: The method of clause 11, wherein: the first user account is associated with a first online platform; and the MCD backup key request is generated by using the first user account to access the first online platform.

Clause 16: The method of clause 15, wherein: the one or more social recovery verification messages are received from the first user; each of the one or more received social recovery verification messages comprises information based on a password associated with logging into the first user account; and the method further comprising processing the one or more received social recovery verification messages to verify each received social verification message is based on information derived from the password associated with the first user account.

Clause 17: The method of clause 11, further comprising: receiving a transaction request involving one or more cryptocurrency tokens associated with the cryptocurrency multi-signature address, wherein: the transaction request comprises either the second authenticating signature or the third authenticating signature; and the transaction request comprises authenticating information indicating the transaction request is from the first user; processing the transaction request to verify the authenticating information; responsive to verifying the authenticating information, generating an authenticated transaction using the first authenticating signature and either the second authenticating signature or the third authenticating signature; and submitting the authenticated transaction to the cryptocurrency network.

Clause 18: The method of clause 17, further comprising: processing the transaction request to determine if the transaction request conforms to a transaction policy of the first user account for the cryptocurrency multi-signature address; and generating the authenticated transaction in response to determining the transaction request conforms to the transaction policy.

Clause 19: A non-transitory computer readable medium comprising instructions that, when executed by at least one processors, cause the at least one processor to manage cryptocurrency by: generating, based on a first private key stored by a cryptocurrency management server (CMS), a first authenticating signature for use in authenticating transactions involving a cryptocurrency multi-signature address of a cryptocurrency network, wherein the first private key is associated with a first user account of a first user on the CMS; receiving a mobile communication device (MCD) backup key request, the MCD backup key request configured to initiate, according to a security policy of the first user account for the cryptocurrency multi-signature address, a process for providing an MCD backup encryption key to the first user, wherein: the second private key is stored by an MCD configured to use the second private key to generate a second authenticating signature for use in authenticating transactions involving the cryptocurrency multi-signature address of the cryptocurrency network; the MCD is further configured to store an encrypted copy of the second private key in a cloud server associated with the MCD, wherein the encrypted copy of the second private key is encrypted using the MCD backup encryption key; and the third private key is stored by a cryptocurrency management device (CMD) configured to use the third private key to generate a third authenticating signature for use in authenticating transactions involving the cryptocurrency multi-signature address of the cryptocurrency network; responsive to receiving the MCD backup key request, verifying the MCD backup key request originated from the first user by either: transmitting to the first user one or more sets of social recovery authentication information, wherein each of the one or more sets of social recovery authentication information is associated with a corresponding social recovery contact from a collection of one or more social recovery contacts indicated by the security policy; and receiving one or more social recovery verification messages that each indicate a corresponding social recovery contact confirms the MCD backup key request originated from the first user, wherein each of the one or more social recovery verification messages is received from the corresponding social recovery contact and is based on the set of social recovery authentication information associated with the corresponding social recovery contact; or transmitting, to a collection of one or more social recovery contacts indicated by the security policy, one or more sets of social recovery authentication information, wherein each of the one or more sets of social recovery authentication information is associated with a corresponding respective social recovery contact from the collection of one or more social recovery contacts; and receiving one or more social recovery verification messages that each indicate a corresponding social recovery contact confirms the MCD backup key request originated from the first user, wherein each of the one or more social recovery verification messages is based on the set of authentication information associated with the corresponding social recovery contact; and responsive to receiving the one or more social recovery verification messages and verifying the MCD backup key request originated from the first user, transmitting the MCD backup encryption key to the first user.

Clause 20: The non-transitory computer readable medium of clause 19, wherein the instructions further cause the at least one processor to manage cryptocurrency by: retrieving, by the MCD, the encrypted backup of the second private key from the cloud server associated with the MCD; and recovering, by the MCD, the second private key, wherein the MCD recovers the second private key by decrypting the retrieved encrypted backup of the second private key using the MCD backup encryption key transmitted by the CMS to the first user.

Clause 21: The non-transitory computer readable medium of clause 19, wherein the instructions further cause the at least one processor to manage cryptocurrency by: processing the one or more received social recovery verification messages to each received social verification message is based on a set of social recovery authentication information of a corresponding social recovery contact; and transmitting to the first user the MCD backup encryption key in response to verifying that each of the one or more received social verification messages are based on respective set of social recovery authentication information associated with corresponding social recovery contacts.

Clause 22: The non-transitory computer readable medium of clause 19, wherein: transmitting the sets of social recovery authentication information comprises transmitting at least a first number of sets of social recovery authentication information; and receiving the one or more social recovery verification messages comprises receiving one or more social recovery verification messages that are collectively based on at least a second number of sets of social recovery authentication information, wherein: the second number is less than or equal to the first number; and each of the at least second number of sets of social recovery authentication information are associated with different social recovery contacts.

Clause 23: The non-transitory computer readable medium of clause 19, wherein: the first user account is associated with a first online platform; and the key recovery request is generated by using the first user account to access the first online platform.

Clause 24: The non-transitory computer readable medium of clause 23, wherein: the one or more social recovery verification messages are received from the first user; each of the one or more received social recovery verification messages comprises information based on a password associated with logging into the first user account; and the method further comprising processing the one or more received social recovery verification messages to verify each received social verification message is based on the information derived from the password associated with the first user account.

Clause 25: The non-transitory computer readable medium of clause 19, wherein the instructions further cause the at least one processor to manage cryptocurrency by: receiving a transaction request involving one or more cryptocurrency tokens associated with the cryptocurrency multi-signature address, wherein: the transaction request comprises either the second authenticating signature or the third authenticating signature; and the transaction request comprises authenticating information indicating the transaction request is from the first user; processing the transaction request to verify the authenticating information; responsive to verifying the authenticating information, generating an authenticated transaction using the first authenticating signature and either the second authenticating signature or the third authenticating signature; and submitting the authenticated transaction to the cryptocurrency network.

Clause 26: The non-transitory computer readable medium of clause 25, wherein the instructions further cause the at least one processor to manage cryptocurrency by: processing the transaction request to determine if the transaction request conforms to a transaction policy of the first user account for the cryptocurrency multi-signature address; and generating the authenticated transaction in response to determining the transaction request conforms to the transaction policy.

Now, therefore, the following is claimed:

1. A cryptocurrency management system, comprising:
a mobile communication device (MCD) configured to:
generate, based on a first private key stored by the MCD, a first authenticating signature for use in authenticating transactions involving a cryptocurrency multi-signature address of a cryptocurrency network; and store, in a cloud server associated with the MCD, an encrypted backup of the first private key, wherein the encrypted backup of the first private key is encrypted using an MCD backup encryption key provided to a cryptocurrency management server (CMS); and the cryptocurrency management server (CMS) configured to:

generate, based on a second private key stored by the CMS, a second authenticating signature for use in authenticating transactions involving the cryptocurrency multi-signature address of the cryptocurrency network, wherein the second private key is associated with a first user account of a first user on the CMS;

store, at the MCD, data associated with one or more recovery devices associated with a security policy of the first user account;

receive, at an interactive user interface of the MCD, input indicating a request to initiate an MCD backup key request, the MCD backup key request initiates, according to the security policy of the first user account for the cryptocurrency multi-signature address, a process for providing the MCD backup encryption key to the first user;

responsive to receiving the MCD backup key request, verifying the MCD backup key request originated from the first user by:

transmitting one or more sets of recovery authentication information, wherein each of the one or more sets of recovery authentication information is associated with a recovery device of the one or more recovery devices associated with the security policy; and receiving one or more recovery verification messages that each indicate that the one or more recovery devices confirm the MCD backup key request originated from the first user, wherein each of the one or more recovery verification messages is based on a set of recovery authentication information associated with a corresponding recovery device; and responsive to receiving the one or more recovery verification messages and verifying the MCD backup key request originated from the first user, transmitting to the first user the MCD backup encryption key.

2. A system of claim 1, wherein the MCD is further configured to:

retrieve, from the cloud server associated with the MCD, the encrypted backup of the first private key; and recover the first private key by decrypting the retrieved encrypted backup of the first private key using the MCD backup encryption key transmitted by the CMS to the first user.

3. The cryptocurrency management system of claim 1, wherein the CMS is further configured to:

process the one or more received recovery verification messages to verify each received verification message is based on one of the one or more sets of recovery authentication information, wherein the one set of recovery authentication information is associated with at least a corresponding recovery verification message and a corresponding recovery device; and transmitting, to the first user, the MCD backup encryption key in response to verifying that each of the one or more received recovery verification messages are based on respective sets of recovery authentication information associated with corresponding recovery devices.

4. The cryptocurrency management system of claim 1, wherein the one or more sets of recovery authentication information transmitted by the CMS comprises at least a first number of sets of recovery authentication information; and wherein the one or more received recovery verification messages comprises one or more recovery verification messages that are collectively based on at least a second number of sets of recovery authentication information, wherein:

the second number is less than or equal to the first number; and each of the second number of sets of social recovery authentication information are associated with different recovery devices.

5. The cryptocurrency management system of claim 1, wherein the CMS and the first user account are associated with a first online platform; and wherein the MCD backup key request is generated by using the first user account to access the first online platform.

6. The cryptocurrency management system of claim 5, wherein the one or more recovery verification messages are received from the first user;

wherein each of the one or more received recovery verification messages comprises information based on a password associated with logging into the first user account; and wherein the CMS processes the one or more received recovery verification messages to verify each received verification message is based on the information derived from the password associated with the first user account.

7. The cryptocurrency management system of claim 1, wherein the CMS is further configured to:

receive a transaction request involving one or more cryptocurrency tokens associated with the cryptocurrency multi-signature address, wherein the transaction request comprises one of the first authenticating signature or the second authenticating signature;

responsive to receiving the transaction request, generate an authenticated transaction using a third authenticating signature and the one of the first authenticating signature or the second authenticating signature; and submit the authenticated transaction to the cryptocurrency network.

8. The cryptocurrency management system of claim 7, wherein the transaction request comprises authenticating information indicating the transaction request is from the first user; and wherein the CMS is further configured to:

process the transaction request to verify the authenticating information; and generate the authenticated transaction in response to verifying the authenticating information.

9. The cryptocurrency management system of claim 8, wherein the CMS is further configured to:

process the transaction request to determine if the transaction request conforms to a transaction policy of the first user account for the cryptocurrency multi-signature address; and generate the authenticated transaction in response to determining the transaction request conforms to the transaction policy.

10. The cryptocurrency management system of claim 9, wherein the transaction policy identifies a threshold amount of value, and wherein generating the authenticated transaction is based on the transaction request being associated with less than the threshold amount of value.

11. A method for managing cryptocurrency, comprising:
generating, based on a first private key stored by a cryptocurrency management server (CMS) of a cryptocurrency management system, a first authenticating signature for use in authenticating transactions involving a cryptocurrency multi-signature address of a cryptocurrency network, wherein the first private key is associated with a first user account of a first user on the CMS;
storing, at a mobile communication device (MCD) of the cryptocurrency management system, data associated with one or more recovery devices associated with a security policy of the first user account,
receiving, at an interactive user interface of the MCD, input indicating a request to initiate an MCD backup key request, the MCD backup key request initiates, according to the security policy of the first user account for the cryptocurrency multi-signature address, a process for providing an MCD backup encryption key to the first user, wherein:
a second private key is stored by the MCD and used to generate a second authenticating signature for use in authenticating transactions involving the cryptocurrency multi-signature address of the cryptocurrency network;
the MCD stores an encrypted copy of the second private key in a cloud server associated with the MCD, wherein the encrypted copy of the second private key is encrypted using the MCD backup encryption key; and
a third private key is stored by a cryptocurrency management device (CMD) of the cryptocurrency management system and used to generate a third authenticating signature for use in authenticating transactions involving the cryptocurrency multi-signature address of the cryptocurrency network;
responsive to receiving the MCD backup key request, verifying the MCD backup key request originated from the first user by:
transmitting one or more sets of recovery authentication information, wherein each of the one or more sets of recovery authentication information is associated with a recovery device of the one or more recovery devices associated with the security policy; and
receiving one or more recovery verification messages that each indicate that the one or more recovery devices confirm the MCD backup key request originated from the first user, wherein each of the one or more recovery verification messages is based on a set of recovery authentication information associated with a corresponding recovery device; and
responsive to receiving the one or more recovery verification messages and verifying the MCD backup key request originated from the first user, transmitting the MCD backup encryption key to the first user.

12. The method of claim 11, further comprising:
retrieving, by the MCD, the encrypted copy of the second private key from the cloud server associated with the MCD; and
recovering, by the MCD, the second private key, wherein the MCD recovers the second private key by decrypting the retrieved encrypted copy of the second private key using the MCD backup encryption key transmitted by the CMS to the first user.

13. The method of claim 11, wherein transmitting the one or more sets of recovery authentication information comprises transmitting at least a first number of sets of recovery authentication information; and
wherein receiving the one or more recovery verification messages comprises receiving one or more recovery verification messages that are collectively based on at least a second number of sets of recovery authentication information, wherein the second number is less than or equal to the first number, and wherein each of the second number of sets of recovery authentication information are associated with different recovery devices.

14. The method of claim 11, further comprising:
processing the one or more received recovery verification messages to verify each received verification message is based on one of the one or more sets of recovery authentication information, wherein the one set of recovery authentication information is associated with at least a corresponding recovery device; and
transmitting, to the first user, the MCD backup encryption key in response to verifying that each of the one or more received recovery verification messages are based on respective sets of recovery authentication information associated with corresponding recovery devices.

15. The method of claim 11, wherein the first user account is associated with a first online platform; and
wherein the MCD backup key request is generated by using the first user account to access the first online platform.

16. The method of claim 15, further comprising:
processing the one or more received recovery verification messages to verify that each received verification message is based on information derived from a password associated with the first user account, wherein the one or more recovery verification messages are received from the first user, and wherein each of the one or more received recovery verification messages includes the information based on the password associated with logging into the first user account.

17. The method of claim 11, further comprising:
receiving a transaction request involving one or more cryptocurrency tokens associated with the cryptocurrency multi-signature address, wherein the transaction request comprises one of the second authenticating signature or the third authenticating signature, and wherein the transaction request comprises authenticating information indicating the transaction request is from the first user;
processing the transaction request to verify the authenticating information;
responsive to verifying the authenticating information, generating an authenticated transaction using the first authenticating signature and the one of the second authenticating signature or the third authenticating signature; and
submitting the authenticated transaction to the cryptocurrency network.

18. The method of claim 17, further comprising:
processing the transaction request to determine if the transaction request conforms to a transaction policy of the first user account for the cryptocurrency multi-signature address; and
generating the authenticated transaction in response to determining the transaction request conforms to the transaction policy.

19. A non-transitory computer readable medium comprising instructions that, upon execution by at least one processor, cause the at least one processor to manage cryptocurrency by:
generating, based on a first private key stored by a cryptocurrency management server (CMS) of a cryptocurrency management system, a first authenticating signature for use in authenticating transactions involving a cryptocurrency multi-signature address of a cryptocurrency network, wherein the first private key is associated with a first user account of a first user on the CMS;
storing, at a mobile communication device (MCD) of the cryptocurrency management system, data associated with one or more recovery devices associated with a security policy of the first user account;
receiving, at an interactive user interface of the MCD, input indicating a request to initiate an MCD backup key request, the MCD backup key request initiates, according to the security policy of the first user account for the cryptocurrency multi-signature address, a process for providing an MCD backup encryption key to the first user, wherein:
  a second private key is stored by the MCD and used to generate a second authenticating signature for use in authenticating transactions involving the cryptocurrency multi-signature address of the cryptocurrency network;
  the MCD stores an encrypted copy of the second private key in a cloud server associated with the MCD, wherein the encrypted copy of the second private key is encrypted using the MCD backup encryption key; and
  a third private key is stored by a cryptocurrency management device (CMD) of the cryptocurrency management system and used to generate a third authenticating signature for use in authenticating transactions involving the cryptocurrency multi-signature address of the cryptocurrency network;
responsive to receiving the MCD backup key request, verifying the MCD backup key request originated from the first user by:
  transmitting one or more sets of recovery authentication information, wherein each of the one or more sets of recovery authentication information is associated with a recovery device of the one or more recovery devices associated with the security policy; and
  receiving one or more recovery verification messages that each indicate the one or more recovery devices confirm the MCD backup key request originated from the first user, wherein each of the one or more recovery verification messages is based on a set of recovery authentication information associated with a corresponding recovery device; and
responsive to receiving the one or more recovery verification messages and verifying the MCD backup key request originated from the first user, transmitting the MCD backup encryption key to the first user.

20. The non-transitory computer readable medium of claim 19, wherein the instructions further cause the at least one processor to manage cryptocurrency by:
retrieving, by the MCD, the encrypted copy of the second private key from the cloud server associated with the MCD; and
recovering, by the MCD, the second private key, wherein the MCD recovers the second private key by decrypting the retrieved encrypted copy of the second private key using the MCD backup encryption key transmitted by the CMS to the first user.

21. The non-transitory computer readable medium of claim 19, wherein the instructions further cause the at least one processor to manage cryptocurrency by:
processing the one or more received recovery verification messages to verify each received verification message is based on one of the one or more sets of recovery authentication information, wherein the one set of recovery authentication information is associated with at least a corresponding recovery device; and
transmitting, to the first user, the MCD backup encryption key in response to verifying that each of the one or more received recovery verification messages are based on respective sets of recovery authentication information associated with corresponding recovery devices.

22. The non-transitory computer readable medium of claim 19, wherein transmitting the one or more sets of recovery authentication information comprises transmitting at least a first number of sets of recovery authentication information; and
wherein receiving the one or more recovery verification messages comprises receiving one or more recovery verification messages that are collectively based on at least a second number of sets of recovery authentication information, wherein the second number is less than or equal to the first number, and wherein each of the second number of sets of recovery authentication information are associated with different recovery devices.

23. The non-transitory computer readable medium of claim 19, wherein the first user account is associated with a first online platform; and
wherein the MCD backup key request is generated by using the first user account to access the first online platform.

24. The non-transitory computer readable medium of claim 23, wherein the instructions further cause the at least one processor to manage cryptocurrency by:
processing the one or more received recovery verification messages to verify that each received verification message is based on the information derived from a password associated with the first user account, wherein the one or more recovery verification messages are received from the first user, and wherein each of the one or more received recovery verification messages includes the information based on the password associated with logging into the first user account.

25. The non-transitory computer readable medium of claim 19, wherein the instructions further cause the at least one processor to manage cryptocurrency by:
receiving a transaction request involving one or more cryptocurrency tokens associated with the cryptocurrency multi-signature address, wherein the transaction request comprises one of the second authenticating signature or the third authenticating signature, and the transaction request comprises authenticating information indicating the transaction request is from the first user;

processing the transaction request to verify the authenticating information;

responsive to verifying the authenticating information, generating an authenticated transaction using the first authenticating signature and the one of the second authenticating signature or the third authenticating signature; and submitting the authenticated transaction to the cryptocurrency network.

26. The non-transitory computer readable medium of claim 25, wherein the instructions further cause the at least one processor to manage cryptocurrency by:

processing the transaction request to determine if the transaction request conforms to a transaction policy of the first user account for the cryptocurrency multi-signature address; and generating the authenticated transaction in response to determining the transaction request conforms to the transaction policy.

27. The non-transitory computer readable medium of claim 19, wherein transmitting the MCD backup encryption key to the first user comprises:

transmitting data to the MCD that enables the MCD to generate the MCD backup encryption key.

\* \* \* \* \*